(12) United States Patent
Machida

(10) Patent No.: US 8,191,068 B2
(45) Date of Patent: May 29, 2012

(54) RESOURCE MANAGEMENT SYSTEM, RESOURCE INFORMATION PROVIDING METHOD AND PROGRAM

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 1424 days.

(21) Appl. No.: 11/666,347

(22) PCT Filed: Oct. 21, 2005

(86) PCT No.: PCT/JP2005/019421
§ 371 (c)(1),
(2), (4) Date: Apr. 26, 2007

(87) PCT Pub. No.: WO2006/046486
PCT Pub. Date: May 4, 2006

(65) Prior Publication Data
US 2008/0141261 A1 Jun. 12, 2008

(30) Foreign Application Priority Data
Oct. 27, 2004 (JP) .................................. 2004-312363

(51) Int. Cl.
*G06F 9/46* (2006.01)
(52) U.S. Cl. ....................................................... 718/104
(58) Field of Classification Search .................. 718/102, 718/104
See application file for complete search history.

(56) References Cited

U.S. PATENT DOCUMENTS

| 6,931,640 B2 | 8/2005 | Asano et al. |
| 7,117,499 B2 | 10/2006 | Kawamoto et al. |
| 7,149,798 B2 * | 12/2006 | Rezvani et al. ............... 709/224 |
| 2003/0218765 A1 | 11/2003 | Ohishi et al. |
| 2003/0229693 A1 * | 12/2003 | Mahlik et al. ................. 709/224 |
| 2004/0103395 A1 | 5/2004 | Sasaki et al. |
| 2004/0107319 A1 * | 6/2004 | D'Orto et al. ................. 711/133 |
| 2005/0119996 A1 * | 6/2005 | Ohata et al. ....................... 707/3 |

FOREIGN PATENT DOCUMENTS

| JP | 2000-40045 A | 2/2000 |
| JP | 2001-075836 A | 3/2001 |
| JP | 2001-175527 A | 6/2001 |
| JP | 2001-331333 A | 11/2001 |
| JP | 2003-157177 A | 5/2003 |
| JP | 2004-005612 A | 1/2004 |
| JP | 2004-21549 A | 1/2004 |
| JP | 2004-178118 A | 6/2004 |
| JP | 2005-004336 A | 1/2005 |

OTHER PUBLICATIONS

K. Czajkowski et al., "Grid Information Services for Distributed Resource Sharing," High Performance Distributed Computing, 2001, Proceedings, 10th IEEE International Symposium, pp. 1-14.

* cited by examiner

*Primary Examiner* — Meng An
*Assistant Examiner* — Blake Kumabe
(74) *Attorney, Agent, or Firm* — Foley & Lardner LLP

(57) ABSTRACT

To provide a resource management system capable of stably providing most recently updated resource information at a high speed. A resource information update unit collects resource information from a plurality of agents by means of agent connection management unit according to an update schedule of resource information stored in a schedule storage unit, and stores the same in a resource information storage unit. A retrieval processing unit accesses the resource information storage unit to acquire retrieval results of resource information. A static schedule generation unit selects update interval for each of resource information, generates a static schedule, and store the same in the schedule storage unit.

23 Claims, 15 Drawing Sheets

FIG. 4

```
RESOURCE PROFILE
  ─ HOST INFORMATION
      • CACHE UPDATING TIME=500msec    // APPROXIMATE TIME
                                           NECESSARY FOR
                                           ACQUIRING INFORMATION
      • DEFAULT UPDATING INTERVAL=3000msec    // UPDATING INTERVAL
                                                 ACCORDING TO UPDATING
                                                 FREQUENCY OF RESOURCE
  ─ NW EQUIPMENT SETTING INFORMATION
      • CACHE UPDATING TIME=2000msec
      • DEFAULT UPDATING INTERVAL=8000msec
  ─ ASSIGNED BAND INFORMATION
      • CACHE UPDATING TIME=1800msec
      • DEFAULT UPDATING INTERVAL=5000msec
```

RESOURCE MANAGEMENT SYSTEM, RESOURCE INFORMATION PROVIDING METHOD AND PROGRAM

TECHNICAL FIELD

The present invention relates to a resource management system, a resource information providing method and a program. More particularly, the present invention relates to a resource management system, a resource information providing method and a program for providing resource information in a distributed information system.

BACKGROUND ART

Conventional resource information management systems for clusters can execute processes for collecting information from all the nodes stably at a high speed because the nodes have a uniform performance and are connected to one another by way of a high speed network. However, in the case of a system for consolidating and managing a plurality of clusters connected by way of a wide area network or a plurality of personal computers of different types, it is time consuming to acquire resource information particularly when the scope of retrieval of resource information is large and the processing time may vary depending on the object of retrieval.

An MDS (monitoring discovery system) described in Non-Patent Publication 1 is known as resource information management system in a wide area distributed system. An MDS manages resource information by means of a directory and, when a retrieval process takes place for resource information, it acquires the required resource information and caches the same in the directory. When another retrieval process takes place for the same resource information, the cached resource information can be provided to the new retrieving party to reduce the retrieving time. The effective period of the cache is defined in advance for the resource information collected by the MDS. When a client requests for information after the expiration of the effective period, the cached information is destroyed and a process for acquiring the most recently updated information is executed. A plurality of MDSs can be linked to one another in a hierarchical manner. Thus, a variety of different systems can be realized by using MDSs to cover a single cluster and large scale distributed systems.

Patent Publication 1 describes a technique wherein a data updating method uses a network server. With the described technique, the frequency of access to the data held in a cache by client terminals is detected and the data is read out from a main server before the holding period of the cache expires to update the data held in the cache. With this arrangement, it is possible to automatically update the cache data that can be expected to be accessed by client terminals in the future, whereby the most recently updated data can be transferred to a client terminal in a short time.

Patent Publication 1: JP-2001-175527-A (FIG. 1, Summary)
Non-Patent Document 1: Grid Information Services for Distributed resource Sharing, Czajkowski, K.; Fitzgerald, S.; Foster, I.; Kesselman, C.; High Performance Distributed Computing, 2001. Proceedings, 10th IEEE International Symposium on, 7-9 Aug. 2001

DISCLOSURE OF THE INVENTION

Problems to be Solved by the Invention

Both the resource information updating system using MDSs and the data updating method of the Patent Publication 1 involve the problem that, when the effective period of the cache has expired, the information used to be held in the cache needs to be collected anew and hence it takes a long time to retrieve the information. Additionally, when there is a request for information that has not been retrieved so far, the information is not found in the cache and hence it takes a long time to retrieve the information. Further, while the information can be acquired at a high speed from the cache within the effective period thereof, the time length required to retrieve the information may vary depending on the state of the cache even if the retrieval process is executed under the same condition, whereby there arises the problem that the retrieval time is not stable.

Therefore, it is an object of the present invention to provide a resource management system, a resource information providing system and a program that can dissolve the problems of the conventional technique and provide the most recently updated resource information stably at a high speed.

Means for Solving the Problems

The present invention provides, in a first aspect thereof, a resource management system including a resource information providing server for providing resource information relating to a plurality of resources connected to a network in response to a request from a resource user, characterized in that the resource information providing server includes: a resource information storage unit storing therein resource information; a schedule storage unit storing therein an updating schedule of the resource information stored in the resource information storage unit; and a resource information update unit for acquiring the resource information based on the schedule stored in the schedule storage unit, and updating the resource information stored in the resource information storage unit by the acquired resource information, and that the schedule storage unit stores therein at least an updating schedule having an updating interval defined for each resource for which resource information is to be acquired.

With the resource management system in the first aspect of the present invention, the resource information stored in the resource information storage unit is updated based on the updating schedule and each resource user is provided with resource information from the resource information memory device. Therefore, it is not necessary to acquire resource information each time a request is received from a resource user, whereby the resource user can be provided with resource information at a high speed. Additionally, since the resource information stored in the resource information storage unit is updated based on the updating schedule at an updating interval defined for each resource, it is possible to update the resource information of each resource based on the characteristics of the resource.

The present invention provides, in a second aspect thereof, a resource management system including a resource information providing server for providing resource information relating to a plurality of resources connected to a network in response to a request from a resource user, characterized in that the resource information providing server includes: a resource information storage unit storing resource information; a schedule storage unit storing an updating schedule of the resource information stored in the resource information storage unit; a resource information update unit for acquiring the resource information according to the schedule stored in the schedule storage unit and updating the resource information stored in the resource information storage unit by the acquired resource information; and a dynamic schedule generation unit for dynamically modifying the updating schedule stored in the schedule storage unit based on at least one of a state of the resources, a state of the resource information providing server and a state of the communication line.

With the resource management system in the second aspect of the present invention, the resource information stored in the resource information storage unit is updated based on the updating schedule and each resource user is provided with resource information from the resource information memory device. Therefore, it is not necessary to acquire resource information each time a request is received from a resource user, whereby the resource user can be provided with resource information at a high speed. Additionally, as the dynamic schedule generation unit dynamically modifies (alters) the updating schedule typically based on the change in the state of each resource and quickly updates the resource information that has changed, whereby the resource user can be provided with the most recently updated resource information.

The present invention provides, in a third aspect thereof, a method for providing resource information by means of a resource information providing server for providing resource information relating to a plurality of resources connected to a network, in response to a request from a resource user, characterized by the steps of: storing in a schedule storage unit an updating schedule defining an updating timing of resource information and including an updating interval selected at least for each resource for which resource information is to be acquired; acquiring resource information based on the updating schedule stored in the schedule storage unit and storing the acquired resource information in a resource information storage unit; and providing the resource information stored in the resource information storage unit in response to a request from a resource information user.

The present invention provides, in a fourth aspect thereof, a program running on a resource information providing server for providing resource information relating to a plurality of resources connected to a network, in response to a request from a resource user, the program allowing the resource information providing server to execute the processings of: storing in a schedule storage unit an updating schedule defining an updating timing of resource information and including an updating interval selected at least for each resource for which resource information is to be acquired; acquiring resource information based on the updating schedule stored in the schedule storage unit and storing the acquired resource information in a resource information storage unit; and providing the resource information stored in the resource information storage unit in response to a request from a resource information user.

With the resource information providing method in the third aspect of the present invention and a program in the fourth aspect of the present invention, the resource information stored in the resource information memory device is updated based on the updating schedule and each resource user is provided with resource information from the resource information memory device. Therefore, it is not necessary to acquire resource information each time a request is received from a resource user, whereby the resource user can be provided with resource information at a high speed. Additionally, since the resource information stored in the resource information memory device is updated based on the updating schedule at an updating interval defined for each type (category) of the resources, it is possible to update the resource information of each resource based on the characteristics of resource.

The present invention provides, in a fifth aspect thereof, a method for providing resource information by means of a resource information providing server for providing resource information relating to a plurality of resources connected to a network in response to a request from a resource user, characterized by the steps of: storing an updating schedule defining the updating timing of resource information in a schedule storage unit; acquiring resource information according to the updating schedule stored in the schedule storage unit and storing the acquired resource information in a resource information storage unit; dynamically modifying the updating schedule stored in the schedule storage unit based on at least one of a state of the resources, a state of the resource information providing server and a state of a communication line; and providing the resource information stored in the resource information storage unit in response to a request from a resource information user.

The present invention provides, in a sixth aspect thereof, a program running on a resource information providing server for providing resource information relating to a plurality of resources connected to a network, in response to a request from a resource user, the program allowing the resource information providing server to execute the processings of: storing an updating schedule defining the updating timing of resource information in a schedule storage unit; acquiring resource information according to the updating schedule stored in the schedule storage unit and storing the acquired resource information in a resource information storage unit; dynamically modifying the updating schedule stored in the schedule storage unit based on at least one of a state of the resources, a state of the resource information providing server and a state of a communication line; and providing the resource information stored in the resource information storage unit in response to a request from a resource information user.

With the resource information providing method in the fifth aspect of the present invention and a program in the sixth aspect of the present invention, the resource information stored in the resource information memory device is updated based on the updating schedule and each resource user is provided with resource information from the resource information memory device. Therefore, it is not necessary to acquire resource information each time a request is received from a resource user, whereby the resource user can be provided with resource information at a high speed. Additionally, as the resource information updating schedule is dynamically modified, the resource user can be provided with the most recently updated resource information typically by dynamically modifying (altering) the updating schedule based on the change in the state of each resource so as to quickly update the resource information that has changed.

Advantages of the Invention

With the resource management system, the resource information providing method and the program according to the present invention, the resource information stored in the resource information memory device is updated based on the updating schedule and each resource user is provided with resource information from the resource information memory device. Therefore, it is not necessary to acquire resource information each time a request is received from a resource user, and the resource user can be provided with resource information afresh and at a high speed. Additionally, the time length required to provide resource information is made uniform to stabilize the resource retrieval.

BEST MODE FOR CARRYING OUT THE INVENTION

With the resource management system in the first aspect of the present invention, it is preferable that the different types of resources have different updating time intervals. Then, the updating intervals can be defined with ease.

In another preferable embodiment, the resource information providing server further includes a static schedule generation unit for generating the updating schedule based on at least one of the pieces of information including the performance of the resource information providing server, the expected frequency of updating resource information, the expected frequency of request for resource information from resource users, the updating time expected to be required to update each piece of resource information and the number of resources and storing the updating schedule in the schedule storage unit. With such an arrangement, the updating process can be adapted to the performance of the server, the characteristics of resources and so on.

In the resource management system in the first aspect of the present invention, the resource information providing server preferably further includes a dynamic schedule generation unit for dynamically modifying the updating schedule stored in the schedule storage unit based on at least one of the state of the resources, the state of the resource information providing server or the state of the communication line. With such an arrangement, it is possible to provide resource users with the most recently updated resource information by dynamically modifying (altering) the updating schedule so as to quickly update the resource information that has changed based on the change in the state of the resources.

In the resource management system according to the invention, the dynamic schedule generation unit can modify the updating schedule corresponding to the increase or decrease of the number of resources. With such an arrangement, it is possible to realize an updating process based on the number of resources.

In the resource management system according to the present invention, when a request for resource information is produced by a resource user, the dynamic schedule generation unit preferably shortens the updating interval of the resource information for which the request is produced. With such an arrangement, it is possible to provide the most recently updated resource information by shortening the updating interval of the resource information for which requests are frequently produced.

In the resource management system according to the present invention, when a trouble arises to any of the resources or the communication line, the updating interval of the resource information relating to the trouble are preferably shortened. With such an arrangement, it is possible to provide the most recently updated resource information that is required to cope with the trouble accurately and quickly.

In the resource management system according to the present invention, when the configuration of a resource is altered, the dynamic schedule generation unit preferably shortens the updating interval of the resource information of the altered resource. With such an arrangement, it is possible to update the resource information stored in the resource information storage unit with the most recently updated resource information.

In the resource management system according to the present invention, the dynamic schedule generation unit preferably prolongs the updating interval of the resource information that has not altered by the past updates of resource information. With such an arrangement, it is possible to reduce the load of the process of updating resource information by prolonging the updating interval of the resource information that has not been changed to a large extent.

In the resource management system according to the present invention, the dynamic schedule generation unit preferably prolongs the updating interval of resource information in general when the load of the resource information providing server or the communication line rises. With such an arrangement, it is possible to reduce the load of the resource information providing server or the communication line by reducing the load of the resource information updating process.

The resource management system according to the present invention may further include an agent for collecting resource information from the resources, the agent being adapted to transmit resource information to the resource information update unit. It is possible for the resource information providing server to collect resource information by way of the agent.

In the resource information management system according to the present invention, the agent may register an automatic notification request that specifies notification conditions and resource information. When the notification conditions specified by the automatic notification request arise, the agent transmits the resource information specified by the automatic notification request to the resource information update unit. With this arrangement, it is possible to update the resource information without accessing the agent from the resource information providing server by causing the agent to notify the resource information, whereby the load of processing can be reduced. Then, the resource information providing server can know the time when it receives a notification from the agent, by specifying a time zone for receiving notifications from the agent as notification condition.

In the resource information management system according to the present invention, the updating schedule may specify the resource information to be acquired at each of the pollyings that the resource information update unit carries out at a predetermined time interval. Then, the resource information update unit acquires the resource information specified so as to be acquired and updates the resource information stored in the resource information storage unit.

In the resource information management system according to the present invention, it may be possible to define the upper limit of the resource information to be acquired at each polling based on the memory capacity of the resource information providing server. Then, it is possible to prevent the load of the resource providing server or the communication line from excessively rising by suppressing the resource information to be acquired when the updating schedule is generated so as not to exceed the defined upper limit.

Now, embodiments of the present invention will be described in greater detail by referring to the accompanying drawings. FIG. 1 shows a resource management system according to a first embodiment of the present invention. The resource management system 100 includes a plurality of resource user terminals 1, a plurality of resource providing servers 2 and a plurality of agents 3. The resource management system 100 is realized as a system that can consolidate, run and manage the resources of the system to be managed including servers, networks and applications.

The resource user terminals 1 and the resource providing servers 2 operate on a computer system, which may typically be a work station etc. The resource providing servers 2 are typically realized as, for example, data centers for providing execution environments (resources) of applications and actually provide the resource user terminals 1 with an execution environment. The agents 3 operate on software and hardware that can acquire resource information. The agents 3 typically acquire setting information of network equipment and assigned band information of applications as resource information 31. The resource providing servers 2 communicate with a plurality of agents 3 to collect resource information that the agents 3 acquire.

Each of the resource user terminals 1 includes a monitor component 11, an autonomous control component 12 and a resource selection component 13. The monitor component 11 transmits a resource information retrieval request to the resource providing servers 2 to acquire resource information. The monitor component 11 monitors the state of the resources based on the resource information thus acquired, and generates a predetermined event based on the state of each of the resources it monitors. The monitor component 11 typically acquires a load information of each of the resource providing servers 2 and, when the load of a recording providing server 2 exceeds a threshold value, it issues an event that indicates the excess.

The monitor component 11 delivers the event it generates into the autonomous control component 12. The autonomous control component 12 stores therein the corresponding relationship between an event and an action to be started for the event as a control policy. The autonomous control component 12 determines the action to be started based on the input from the monitor component 11, referring to the control policy, and delivers an execution request of the action to the resource selection component 13. The autonomous control component 12 typically receives as input an event indicating that the load of the server resource that the resource user terminal 1 is using exceeds the threshold value and delivers an action execution request for supplementing the server resource to the resource selection component 13.

The resource selection component 13 provides a resource selection function when an action is to be executed. Whenever necessary, the resource selection component 13 acquires resource information from the resource providing servers 2 via the monitor component 11 and determines a resource providing server 2 to which an action execution request is to be forwarded based on the acquired resource information. When an action execution request for supplementing a server resource is input, the resource selection component 13 typically acquires resource information from a plurality of resource providing servers 2, retrieves a resource providing server 2 holding a resource that can be supplied as supplement and transmits an action execution request for supplying the resource as supplement to the resource providing server 2 holding the resource that can be supplied as supplement.

Each of the resource providing servers 2 includes a resource information retrieval component 21, a resource management component 22 and a workflow management component 23. The resource management component 22 manages accesses to the agents 3 that are objects of management. The resource management component 22 communicates with a plurality of agents 3 that are objects of management to collect and hold resource information 31. The resource information retrieval component 21 receives a request for a resource information retrieval process from any of the resource user terminals 1, acquires resource information from the resource management component 22 and forwards back the acquired resource information to the resource user terminal 1.

The workflow management component 23 receives the action execution request from the resource user terminal 1 and generates a detailed workflow based on the action execution request. Whenever necessary at this time, the workflow management component 23 transmits a resource information retrieval request to the resource information retrieval component 21 and acquires resource information. The agent 3 has the functions of executing a command, writing the property file of an application, managing the state of assignment and so on. The workflow generated by the workflow management component 23 is transmitted to the agent 3 by way of the resource management component 22 and executed by the agent 3.

FIG. 2 shows the detailed configuration of the resource management component 22 and agents 3. Each agent 3 includes a manager connection unit 301 and a resource information acquisition unit 302. The manager connection unit 301 manages the connection between the agent 3 and the resource management component 22. The resource information acquisition unit 302 acquires resource information 31 from the object of management.

The resource management component 22 includes a retrieval processing unit 221, a resource information storage unit 222, a resource information update unit (cash update unit) 223, a static schedule generation unit 224, a schedule storage unit 223, an agent connection management unit 226 and a workflow execution unit 227. The agent connection management unit 226 communicates with the agent 3. The workflow execution unit 227 receives the workflow generated by the workflow management component 23 as input and operates the agent 3 based on the workflow so as to execute the workflow by way of the agent connection management unit 226.

The static schedule generation unit 224 generates a resource information updating schedule (cache updating schedule) and stores the same in the schedule storage unit 225. The manager may directly operate the updating schedule stored in the schedule storage unit 225 by way of an input unit 4. The resource information update unit 223 acquires resource information 31 from the agent 3 by way of the agent connection management unit 226 based on the updating schedule stored in the schedule storage unit 225 and stores the same in the resource information storage unit (cache) 222.

The resource information update unit 223 acquires resource information 31 from the agent 3 by means of a polling, for example, that is repeated at the predetermined time interval. The schedule storage unit 225 stores the timetable that specifies the resource information to be updated at each polling and the resource information update unit 223 acquires the specified resource information based on the timetable and updates the resource information stored in the resource information storage unit 222. The retrieval processing unit 221 retrieves the resource from the inside of the resource information storage unit 222 based on the request from the resource information retrieval component 21 and forwards back the requested resource information to the resource information retrieval component 21.

Upon generating a static schedule, the static schedule generation unit 224 refers to the performance information of the computer system that realizes the resource management component 22 and other information (parameters) including the frequency of updating the resource information, the time length required to update the resource information, the application of the resource information, the performance of the server and the network and the number of the objects of management. Then, the static schedule generation unit 224 generates a static schedule that can realize a cache updating process that matches the system performance, while satisfying the request of the user.

Upon generating a static schedule, the static schedule generation unit 224 appropriately selects the number of simultaneous accesses of agents and updating the interval so as not to give rise to an excessive load to the servers and the network. For example, when agents accesses tens of several server hosts, it limits the number of simultaneous accesses of agents and shifts the timings of accesses of agents by several seconds in order to prevent the load of the computers and the network from being raised excessively. Additionally, it prolongs the updating interval of each resource to prevent accesses of agents from taking place too frequently when there are a large number of pieces of resource information as the objects of management.

The static schedule generation unit 224 has rules for determining the polling intervals and the number of simultaneous accesses of agents based on the CPU performance and the memory capacity in the memory device. The static schedule generation unit 224 acquires information on the CPU performance and the memory capacity of the computer system that realizes the resource management component 22 and determines the polling interval and the number of simultaneous accesses of agents based on the rules stored in the memory device. The resource information update unit 223 operates for pollyings at the determined time interval.

The static schedule generation unit 224 selects a smaller polling interval when the CPU clock operates at a high speed and a large number of simultaneous accesses of agents when the memory capacity is large. For example, the static schedule generation unit may select a second for polling interval when the CPU clock is 2 GHz or higher and 15 for the number of simultaneous accesses of agents when the memory capacity is 1 GB or greater.

The static schedule generation unit 224 selects the frequency of updating each piece of resource information based on the characteristics of the corresponding resource. For example, the static schedule generation unit 224 selects a shorter updating interval for the CPU utilization ratio, the memory utilization ratio and so on that need to be updated more frequently, compared with the configuration information and selection information that may be updated less frequently. It also selects a longer updating interval for resource information that requires a longer acquisition time length.

Priority may be defined for each piece of resource information. The static schedule generation unit 224 updates more frequently pieces of resource information having a higher priority than pieces of resource information having a lower priority. Upon defining the priority, the static schedule generation unit 224 provides a higher priority to pieces of resource information that are requested more frequently by users so that those pieces of resource information may be updated with a higher priority. Again, a relatively long interval will be selected to update pieces of resource information that only few users request to be updated frequently.

FIG. 3 illustrates the algorithm for the generation of the static schedule by the static schedule generation unit 224. In the following, three categories of resource information including the category of server hosts, that of network equipment and that of assigned bands will be discussed. Additionally, it is assumed that the polling interval of the resource information update unit 223 is one second and the number of simultaneous accesses of agents (maximum value) is 7. The static schedule generation unit 224 has a resource profile that stores the approximate time length necessary for acquiring resource information and the initial value of the resource information updating interval for each resource category. A plurality of resource profiles may be provided depending on the network bandwidth. As the manager specifies resource categories and registers resource information by way of the input unit 4, the static schedule generation unit 224 selects an updating interval for each category of resource information, referring to the related resource profile (Step A1).

Assume here that the static schedule generation unit 224 has a resource profile as shown in FIG. 4. The resource profile defines the updating interval for the case of the network bandwidth being 100 B/s, for example. In this case, if Host01 through Host08 are registered as server hosts, the static schedule generation unit 224 selects 3 seconds for the updating interval of resource information of each server host. In addition, if L2SW (layer 2 switch), L3SW (layer 3 switch), FW (firewall), PS (packet shaper) and LB (load balancer) are registered as network equipment, the static schedule generation unit 224 selects 8 seconds for the updating interval of the resource information of the network equipment. Similarly, as band information of AP1 and that of AP2 are registered as information of assigned bands for applications, the static schedule generation unit 224 selects 5 seconds for the updating interval of the band information of those applications.

The static schedule generation unit 224 divides the number of simultaneous accesses of agents based on the number of pieces of resource information belonging to the categorized resources (Step A2) and selects the number of simultaneous accesses of agents for each category. For example, the static schedule generation unit 224 may select 4 as the number of simultaneous accesses of agents for server hosts, 2 as the number of simultaneous accesses of agents for network equipment and 1 as the number of simultaneous accesses of agents for band information of applications.

The static schedule generation unit 224 determines whether or not an updating schedule is generated for all the categories (Step A3) and, if there is at least an unprocessed category, it further executes a process of preparing an updating schedule for each category. In the process of preparing an updating schedule for each category, the static schedule generation unit 224 firstly sorts pieces of resource information based on the priorities assigned to the respective categories of resource information (Step A4). Then, the static schedule generation unit 224 assigns priorities to the categories of resource information in the descending order of priorities based on the updating interval selected in Step A1 (Step A5). When it is determined that an updating schedule is prepared for all the categories, the process comes to an end.

FIG. 5 exemplifies the static schedule generated by the static schedule generation unit 224. In FIG. 5, the abscissa indicates the time length elapsed since the current clock time so as to correspond to pollyings. In addition, each shaded area shows that the resource information is specified so as to be updated at the corresponding poll.

The static schedule generation unit 224 determines the timing in the default updating interval of the pieces of resource information of each category and generates an updating pattern for the updating interval in Step A5. At this step, the static schedule generation unit 224 so regulates the updating timing of each piece of resource information that the number of simultaneous accesses of agents defined in Step A2 for each category may not be exceeded. For example, as for the category of host servers, the static schedule generation unit 224 determines the timing in the updating interval (3 seconds) of each of the pieces of resource information belonging to the category and generates an updating pattern for the updating period of 3 seconds. Thereafter, the static schedule generation unit 224 arranges the generated updating pattern repeatedly to generate an updating schedule as shown in FIG. 5.

FIG. 6 shows operation of the cache updating process in a flowchart. The resource information update unit 223 acquires the list of pieces of resource information to be updated at the current polling (1 second after the timetable of FIG. 5) from the schedule storage unit 225 (Step B1), and confirms the pieces of resource information for which the cache needs to be updated. The resource information update unit 223 generates an agent access request necessary for the cache updating process based on the list it acquires in Step B1 (Step B2), and delivers the generated agent access request to the agent connection management unit 226. Upon receiving the agent access request, the agent connection management unit 226 communicates with the agent 3 to be updated and executes the process for acquiring resource information (Step B3). The agent connection management unit 226 acquires the most recently updated resource information 31 from the agent 3 (Step B4), and stores the acquired resource information 31 in the resource information storage unit 222 (Step B5).

For example, if the schedule storage unit 225 stores therein the timetable as illustrated in FIG. 5, the resource information update unit 223 acquires "Host01", "Host04", "L2SW", "PS" and "AP1" from the schedule storage unit 225 in Step B1, and confirms that the resource information to be updated this time includes the setting information for Host01, Host04, L2S and PS and assigned band information of application AP1. Subsequently, the resource information update unit 223 generates an access request to the agent 3 from which the resource information to be updated is to be acquired. As a result, the resource information of the resource specified in the updating schedule is updated out of the pieces of resource information of resources stored in the resource information storage unit 222.

FIG. 7 shows the operation of executing the resource information retrieval requesting process in a flowchart. If the resource user terminal 1 delivers a retrieval request in a resource providing server 2, the retrieval processing unit 221 receives the retrieval request by way of the resource information retrieval component 21 (Step C1). The retrieval processing unit 221 executes pre-retrieval processes including a process of creating an inquiry for accessing the resource information storage unit 222 and a process of checking the limit of accesses (Step C2), and acquires resource information from the resource information storage unit 222 (Step C3). Thereafter, the retrieval processing unit 221 executes post-retrieval processes including a format conversion process for results information and a process of adding additional information (Step C4), and forwards back the outcome of the retrieval to the resource user terminal 1 that generated the retrieval request (Step C5).

FIG. 8 shows the operation of the resource management system in a flowchart. The autonomous control component 12 specifies the resource information to be monitored to the monitor component 11. The monitor component 11 periodically generates a retrieval process for retrieving resource information of the resource to be monitored that is specified by the autonomous control component 12, and following the sequence illustrated in FIG. 7, acquires the resource information to be retrieved to monitor the state of the resource (Step D1). The monitor component 11 includes a memory device for storing therein conditions of event generation, and determines whether or not an event is to be generated based on the acquired resource information, by referring to the memory device (Step D2).

The monitor component 11 issues an event when it determines that the resource information acquired in Step D1 meets the conditions of event generation, and notifies the autonomous control component 12 of the generation of the event. Events that the monitor component 11 generates include load change events, obstacle generation events and timer starting events. The monitor component 11 returns to Step D1 without generating an event and regains the monitoring state when it determines that the resource information acquired in Step D1 does not meet the conditions of event generation.

The autonomous control component 12 stores therein the control policy that describes the action to be taken for the notified event. The action to be started includes, for example, addition of a host, alteration of network band assignment and notification of application load. Upon receiving notification of the generated event, the autonomous control component 12 retrieves the control policy (Step D3), and determines whether or not the action for the notified event is described in the control policy (Step D4). If it is determined in Step D4 that the action for the notified event is not described in the control policy, the autonomous control component 12 returns to Step D1 and regains the monitoring state. If it is determined in Step D4 that the action for the notified event is described in the control policy, the autonomous control component 12 generates an action execution request based on the control policy and delivers the request to the resource selection component 13 (Step D5).

The resource selection component 13 retrieves the resource information and selects the resource by way of the monitor component 11 based on the input action execution request (Step D6), and determines whether or not the requested action can be processed in the current environment (Step D7). The resource selection component 13 retrieves idle servers and selects one of the resource providing servers 2 having an idle server in response to a request for adding a server resource, for instance. If there is not any resource providing server 2 having an idle server, the resource selection component 11 determines that it is not possible to execute the requested action.

If the resource selection component 13 determines in Step D7 that the requested action cannot be taken, it notifies the manager of the fact that it failed in taking the action (Step D8), and returns to Step D1 to regain the monitoring state. If the resource selection component 13 determines in Step D7 that the requested action can be taken, it transmits an action execution request to the resource providing server 2 selected in Step D6.

The resource providing server 2 receives the action execution request by way of the workflow management component 23. The workflow management component 23 associates the action execution request with the workflow that is to be generated in response to the execution request and, stores the same in a memory device (not shown). The workflow management component 23 refers to the memory device and generates a detailed workflow according to the received action execution request (Step D9).

When, for example, the workflow management component 23 receives an action execution request for adding the object server to an load balancer, it directs the resource information retrieval component 21 to retrieve the setting information of the current load balancer at the time of generating the workflow in Step D9, and acquires the setting information. Thereafter, in Step D9, it generates a setting where the object server to be added is actually added to the current setting, and also generates a workflow for allowing the load balancer to alter the setting.

The workflow management component 23 transmits the generated workflow to the workflow execution unit 227 and requests the latter to execute the workflow (Step D10). The workflow execution unit 227 operates the agent 3 by way of the agent connection management unit 226 based on the received workflow (Step D11) to execute the workflow.

The workflow execution unit 227 determines whether or not the operation to the agent 3 succeeded (Step D12). If it is determined that the operation succeeded, it notifies the completion of the process (Step D14), and returns to Step D1, where it regains the monitoring state. If it is determined that the operation failed, the workflow execution unit 227 notifies the failure (Step D13), and returns to Step D1, where it regains the monitoring state. The operation of monitoring the resource information in Step D1 is conducted periodically and, if a plurality of events takes place simultaneously, the sequence of the process from Step D2 to Step D14 is executed for the plurality of events concurrently.

In the present embodiment, the resource providing server 2 collects resource information 31 from the agents 3 based on the updating schedule stored in the schedule storage unit 225, and stores the same in the resource information storage unit 222. When the resource providing server 2 receives a retrieval request from the resource user terminal 1, the resource providing server 2 forwards back the resource information stored in the resource information storage unit 22 to the resource user terminal 1. Therefore, the resource user terminal 1 can quickly obtain the retrieved resource information if compared with an arrangement where the agents 3 are accessed to acquire resource information each time a retrieval process takes place.

Since resource information can be acquired in a short time in the present embodiment after a retrieval process takes place, the state of resources can be monitored with ease in an environment where resources are widely distributed. Additionally, since the retrieval process from the resource selection component 13 is executed at a high speed, the resource selection process is also executed at a high speed in the environment where resources are widely distributed. Further, since the retrieval process from the workflow management component 23 is executed at a high speed, the time length for generating a workflow is reduced and the workflow generation process is stabilized.

In the present embodiment, the static schedule generation unit 224 selects the updating interval of the resource information of each resource category and generates an updating schedule. Thus, it is possible to realize an updating process of resource information for each resource category based on the characteristics of resources of the category. Additionally, as the resource information storage unit 222 stores the most recently updated resource information, it is possible to provide the resource user terminal 1 with the most recently updated resource information. Therefore, the resource user terminal 1 can generate an event according to the latest state of resources and hence autonomously deal with the event at a higher speed.

For accessing the agents 3 to acquire resource information and provide the same to a resource user terminal 1, upon generation of a retrieval processing, the time length needed for the resource user terminal 1 to acquire the resource information varies depending on the resource information to be retrieved, if the time length for accessing the agents 3 varies from agent to agent. On the other hand, in the present embodiment, the resource information requested to be retrieved is provided from the resource information storage unit 222, the range of variation in the time length required for the acquisition of resource information among the agents 3 can be concealed, whereby is possible to provide the resource user terminal 1 with resource information in a stabilized retrieval time.

It is assumed here that an event (action) of adding a host takes place, for example. In such a case, if it takes a long time to retrieve resource information and the host adding process has not completed when the next event of adding another host takes place, the another host adding process needs to be started in a duplicated process. For avoiding such a situation, it is necessary to check whether or not the current host adding process is still going when the next event of adding the another host takes place. With the present embodiment, a process of retrieving the resource information is completed in a stabilized retrieval time so that such a checking operation is not required because the retrieval time is shorter than the cycle of event generation. Thus, since the present embodiment can provide resource information in a stabilized retrieval time, it is possible to alleviate the load of management in various states that arise due to a prolonged resource information retrieval time.

FIG. 9 shows the configuration of a resource management component 22a in a resource management system according to a second embodiment of the present invention. The resource management component 22a includes an event management unit 228, a dynamic schedule generation unit 229, a system state monitor unit 230, a cache monitor unit 231, a retrieval process monitor unit 232 and a trouble detection unit 233 in addition to the units illustrated in FIG. 2. In the present embodiment, the dynamic schedule generation unit 229 dynamically modifies the updating schedule stored in the schedule storage unit 225.

The system state monitor unit 230 monitors the load information of the computer system that realizes the resource management component 22a, and the traffic of the network. The system state monitor unit 230 issues an event under predetermined conditions based on the load information and the traffic. When the resource information stored in the resource information storage unit 222 is updated by the resource information update unit 223, the cache monitor unit 231 compares the resource information before the update and the resource information after the update, and monitors whether or not a change takes place due to the update. Then, it issues an event that can be differentiated depending on whether or not the change takes place.

The retrieval process monitor unit 232 monitors the retrieval process that the retrieval process unit 221 receives. If the retrieval process unit 221 receives the retrieval process, the retrieval process monitor unit 232 issues an event that indicates the reception of the retrieval process. The trouble detection unit 233 monitors the network being managed by the resource providing server 2 and, when a trouble takes place in the network, the trouble detection unit 233 issues an event that indicates the occurrence of the trouble. In the present embodiment, the workflow execution unit 227 issues an event based on the workflow to be executed when it executes the workflow.

The event management unit 228 monitors the events generated by the workflow execution unit 227, the system state monitor unit 230, the cache monitor unit 231, the retrieval process monitor unit 232 and the trouble detection unit 233. When, for instance, the workflow execution unit 227 issues an event indicating the execution of a workflow that produces a change in the state of a resource as a result of the execution of the workflow, the event management unit 228 acquires information relating to the changed resource from the workflow execution unit 227. Thereafter, the event management unit 228 notifies the dynamic schedule generation unit 229 of an event indicating the execution of the workflow that involves a change in the state of the resource and information on the changed resource.

When, for instance, the system state monitor unit 230 issues an event indicating that an increase of the load of the computer system takes place, the event management unit 228 acquires information on the load from the system state monitor unit 230 and notifies the dynamic schedule generation unit 229 of the fact that the event takes place and the acquired load information. When the cache monitor unit 231 issues an event indicating that the resource information is not changed by the update, the event management unit 228 acquires information relating to the unchanged resource information from the cache monitor unit 231 and notifies the dynamic schedule generation unit 229 of the fact that the event takes place and the information relating to the unchanged resource information.

When, for instance, the retrieval process monitor unit 232 issues an event indicating that a retrieval process takes place, the event management unit 228 acquires information relating to the retrieved resource information from the retrieval process monitor unit 232 and notifies the dynamic schedule generation unit 229 of the fact that the event takes place and the information relating to the retrieved resource information. When the trouble detection unit 233 issues an event indicating that a trouble takes place in the network, the event management unit 228 acquires information relating to the location of the trouble that takes place from the cache monitor unit 231 and notifies the dynamic schedule generation unit 229 of the fact that the event takes place and the information relating to the location of the trouble that takes place.

Immediately after the start of operation of the resource management system, the schedule storage unit 225 stores therein the updating schedule generated by the static schedule generation unit 224. The dynamic schedule generation unit 229 alters the updating schedule stored in the schedule storage unit 225 based on the notifications from the event management unit 228. Alternatively, the dynamic schedule generation unit 229 regenerates an updating schedule and stores the same in the schedule storage unit 225.

FIG. 10 shows the operation of the cache updating schedule modifying process in a flowchart. The event management unit 228 monitors the generation of an event (Step E1) and determines whether or not an event takes place (Step E2). If it is determined in Step E2 that no event takes place, the event management unit 228 returns to Step E1 and stands by there until an event takes place.

When it is determined in Step E2 that an event takes place, the event management unit 228 determines whether or not the generated event influences the resource information updating schedule and also whether or not the updating schedule requires adjustment (Step E3). If it is determined in Step E3 that the updating schedule does not require any adjustment, the event management unit 228 returns to Step E1 and stands by there until an event takes place.

The event management unit 228 associates the events generated by the workflow generation unit with the pieces of information indicating whether or not the state of resources is altered by the execution of a workflow and stores them. The event management unit 228 determines whether or not the updating schedule requires adjustment as a result of the generation of an event by referring to the pieces of information. If, for example, an event is notified by the workflow execution unit 227 and the event indicates the execution of a workflow that alters the setting of the server hosts and the network equipment, the event management unit 228 determines that the updating schedule requires adjustment in Step E3.

If an event is notified by the system state monitor unit 230 and the event indicates a rise of the load of the computer system, the event management unit 228 determines that the updating schedule requires adjustment in Step E3. If an event is notified by the cache monitor unit 231 and the event indicates that the resource information is not changed by an update, the event management unit 228 determines that the updating schedule requires adjustment. If an event is notified by the retrieval process monitor unit 232 and the event indicates that a retrieval process takes place for the resource information, the event management unit 228 determines that the updating schedule requires adjustment. If an event is notified by the trouble detection unit 233 and the event indicates that a trouble takes place, the event management unit 228 determines that the updating schedule requires adjustment.

When the event management unit 228 determines that the updating schedule requires adjustment in Step E3, it notifies the dynamic schedule generation unit 229 of the fact that an event that influences the schedule takes place and the information acquired from the workflow execution unit 227, the system state monitor unit 230, the cache monitor unit 231, the retrieval process monitor unit 232 or the trouble detection unit 232. The dynamic schedule generation unit 229 has a schedule alteration policy file that describes the rules for deciding how to adjust the updating schedule in response to each event of which it may be notified and executes a process of adjusting the updating schedule in response to the event that takes place by referring to the schedule alteration policy file (Step E4).

Now, the adjustment of the updating schedule in Step E4 will be described in detail below. FIG. 11 shows the configuration of a computer system that is an object of management. The adjustment of the updating schedule that the dynamic schedule generation unit 229 carries out will be described by way of an example where a workflow of moving Host01 from pool server 50 to business AP cluster 60 is executed by referring to FIG. 11. The event management unit 228 receives a notification of an event of moving Host01 to the business AP cluster 60 from the workflow execution unit 227, and notifies the dynamic schedule generation unit 229 of information relating to the generated event.

The dynamic schedule generation unit 229 has information with respect to the configuration of the network system that is an object of monitoring, as information models such as CIM (common information model). As the workflow is executed by referring to information relating to the configuration, the dynamic schedule generation unit 229 lists up the pieces of resource information for which the cache needs to be updated quickly. In the example of FIG. 11, the dynamic schedule generation unit 229 lists up the information on the assignment of the Host01, the IP address information of the Host01, the information on the setting of the L2 switch, the information on the setting of the FW, the information on the application that operates on the Host01, the information on the back end (Host05) of the application and the information on the setting of the LB as pieces of resource information that need to be updated quickly.

The schedule alteration policy file describes that the pieces of resource information on alterations of settings need to be updated quickly as the policy for modifying the updating schedule when any of the resource settings is altered. The dynamic schedule generation unit 229 modifies the updating schedule stored in the schedule storage unit 225 so as to update the pieces of resource information listed up as those that need to be updated quickly at the time of the next polling by the resource information update unit 223 by referring to the schedule alternation policy file. By doing so, the pieces of resource information stored in the resource information storage unit 222 are updated immediately by the resource information update unit 229 so that the most recently updated pieces of information can be provided from the resource information storage unit 222.

Additionally, if a server host is added or deleted, for example, as a result of the execution of the workflow while the system is in operation, the dynamic schedule generation unit 229 is notified of information relating to the event for the same. The schedule modification policy file describes that, when the number of resources is increased or decreased, the updating schedule is to be regenerated so as to be adapted to the number of resources after the change. The dynamic schedule generation unit 229 determines the number of simultaneous accesses of agents based on the number of resources after the change by means of an algorithm similar to that of the static schedule generation unit 224 (FIG. 3) and generates an updating schedule of each resource. As a result, the process of updating the resource information based on the number of resources is executed.

The schedule alteration policy file describes to prolong or shorten the updating the interval based on the load or the traffic as the policy to be started when the load of the computer system or the traffic of the network rises. When, for example, the system state monitor unit 230 issues an event indicating that the CPU load exceeds 90%, the dynamic schedule generation unit 229 receives a notification of the event by way of the event management unit 228. Then, the dynamic schedule generation unit 229 alters the polling interval of the resource information update unit 223 from 1 second to 1.5 seconds, for example, to prolong the resource information updating interval.

When, for example, the system state monitor unit 230 issues an event indicating that the network traffic is not higher than 5 kbps, the dynamic schedule generation unit 229 receives a notification of the event by way of the event management unit 228. Then, the dynamic schedule generation unit 229 reduces the polling interval only once in the updating interval of the resource information belonging to, for example, the server host, so as to raise the frequency of updating the resource information. In this way, it is possible to execute a cache updating process so as to suppress any overload by changing the updating interval and adapting to the environment of the system that is changing on a real time basis.

The schedule alteration policy file describes to prolong the updating interval of the resource information stored in the resource information storage unit 222 as the policy to be started when the resource information is not changed by an update of the resource information by the resource information update unit 223. When the cache monitor unit 231 issues an event indicating that the resource information is not changed by an update, the dynamic schedule generation unit 229 receives a notification of the event by way of the event management unit 228 and modifies the updating schedule stored in the schedule storage unit 225 so as to prolong the resource information updating interval from the current updating interval.

For example, if the resource information of the Host02 in FIG. 11 is not changed, the dynamic schedule generation unit 229 alters the resource information updating interval of the Host02 from the initial value (3 seconds) for the server hosts defined by the static schedule generation unit 224 to 4 seconds. Thereafter, an updating schedule is prepared for the Host02 based on the altered updating interval, and the updating schedule stored in the schedule storage unit 225 is modified. Thus, the frequency of updating the resource information whose value is not changed can be reduced by doing so.

The schedule alteration policy file describes to prolong the updating interval of the resource information stored in the resource information storage unit 222 as the policy to be started when the resource information is not changed by an update of the resource information by the resource information update unit 223. When the cache monitor unit 231 issues an event indicating that the resource information is not changed by an update, the dynamic schedule generation unit 229 receives a notification of the event by way of the event management unit 228 and modifies the updating schedule stored in the schedule storage unit 225 so as to prolong the resource information updating interval from the current updating interval.

The schedule alteration policy file describes to shorten the updating interval of the resource information to which a retrieval process takes place as the policy to be started when a retrieval process takes place. When the retrieval process monitor unit 232 issues an event indicating that a retrieval process takes place, the dynamic schedule generation unit 229 receives a notification of the event by way of the event management unit 228 and modifies the updating schedule stored in the schedule storage unit 225 so as to shorten the resource information updating interval of the resource information to which the retrieval process takes place and those of the pieces of resource relating to that resource information from the current updating interval.

For example, when a retrieval process takes place to the resource information of the Host01, the dynamic schedule generation unit 229 alters the updating interval of the resource information of the Host01 from the initial value (5 seconds) for the server hosts to 4 seconds. Additionally, the updating interval of the resource information relating to the Host01 are shortened from the current level. Thereafter, an updating schedule is prepared for the Host01 and the related resource information based on the altered updating interval, and the updating schedule stored in the schedule storage unit 225 is modified. Thus, the updating interval of the resource information in which users are highly interested are reduced and resource information that is retrieved frequently is updated also frequently, whereby users can be provided with the most recently updated resource information.

The schedule alteration policy file describes to intensively update the resource information relating the resource to which a trouble occurs as the policy to be started when a trouble occurs. When the trouble detection unit 233 issues an event indicating that a trouble occurs, the dynamic schedule generation unit 229 receives a notification of the event by way of the event management unit 228 and modifies the updating schedule of the resource information relating to the resource to which a trouble occurs, whereby the resource information is updated immediately.

With this arrangement, it is possible to provide the most recently updated resource information for the resource that need to be handled accurately and quickly for the trouble.

In the present embodiment, the dynamic schedule generation unit 229 dynamically changes the updating schedule stored in the schedule storage unit 225 based on the events being managed by the event management unit 228, and the resource information update unit 223 updates pieces of resource information based on the schedule that dynamically changes. With this arrangement, the present embodiment provides the advantage of efficiently collecting resource information based on the natures of resources and the state of the computer system for realizing the resource management component 22*a* in addition to the advantages of the first embodiment.

FIG. 12 shows an agent in a resource management system according to a third embodiment. The overall configuration of the resource management system of the present embodiment is similar to that of the first or second embodiments; however, at least some of the agents 3 have the configuration as shown in FIG. 12. In the present embodiment, either the static schedule generation unit 224 or the dynamic schedule generation unit 229 requests the agents 3*a* to automatically transmit resource information from the side of the agent 3.

Each of the agents 3*a* includes a notification management unit 303 and an event management unit 304 in addition to the manager connection unit 301 and the resource information acquisition unit 302. If the agent 3a receives a request for transmission of resource information from the resource information update unit 223, the agent 3a operates similarly to the agents 3 of the first and second embodiments to acquire the required resource information 31, and transmit the same to the resource information update unit 223. The event management unit 304 manages the events that are generated in the inside and at the outside of the agents 3a. The notification management unit 303 stores information on authorization and non-authorization of automatic transmission of resource information and the conditions of transmission of resource information when automatic transmission is authorized.

The static schedule generation unit 224 or the dynamic schedule generation unit 229 transmits an automatic notification request including information specifying the conditions of transmission of resource information to the agent 3a that is to automatically transmit resource information. Upon receiving the automatic notification request from the static schedule generation unit 224 or the dynamic schedule generation unit 229, the notification management unit 303 of the agent 3a stores information that automatic transmission of resource information is authorized and also the conditions of transmission of resource information contained therein.

The static schedule generation unit 224 or the dynamic schedule generation unit 229 specifies transmission at predetermined time interval or transmission in response to a predetermined event as condition of transmission of resource information. If, for instance, transmission resource information at a predetermined time interval is specified as condition of transmission, the agent 3a starts the process of acquiring resource information at the specified predetermined time intervals and transmits the acquired resource information to the resource information update unit 223. If, on the other hand, transmission in response to a predetermined event is specified as condition of transmission, the event management unit 304 starts the process of acquiring resource information at the timing of detection of such a predetermined event and transmits the acquired resource information to the resource information update unit 223.

FIG. 13 shows in a flowchart the procedure of registering an automatic transmission of resource information in the notification management unit 303. While the static schedule generation unit 224 transmits an automatic notification request for resource information in the following description, a similar sequence of operation is executed if the dynamic schedule generation unit 229 transmits the automatic notification request. When there is an agent to which automatic notification of resource information is to be requested for generation of a static schedule, the static schedule generation unit 224 (FIG. 2) transmits an automatic notification request to the agent 3a (Step F1).

For example, the static schedule generation unit 224 transmits an automatic notification request to the agent 3a that acquires resource information on a resource that belongs to the category of network equipment. At this step, information specifying the clock time for starting the transmission and the interval of transmission of resource information is contained in the automatic notification request as the condition of transmission based on the generated static schedule (FIG. 5) so that the resource information update unit 223 can update the resource information. Then, the agent 3a receives the automatic notification request at the manager connection section 301 (Step F2). The notification management unit 303 stores the condition of transmission of resource information based on the received automatic notification request (Step F3).

FIG. 14 shows in a flowchart the procedure of the resource information notifying process that an agent 3a follows when transmitting resource information at the specified time interval. The notification management unit 303 stores therein the fact that automatic transmission is authorized and the specified time interval of transmission of resource information. The notification management unit 303 stands by until the timing of the next transmission of resource information arises (Step G1). When the specified clock time arises for starting transmission of resource information under the transmission conditions registered by following the sequence of FIG. 13 or the specified time elapses since the last transmission of resource information, the notification management unit 303 starts the process for notification of resource information and acquires resource information 31 by way of the resource information acquisition unit 302.

The notification management unit 303 transmits the acquired resource information 31 toward the resource information update unit 223 by way of the manager connection unit 301 (Step G3). The agent 3a repeats Steps G1 through G3 and transmits resource information to the resource information update unit 322 at the specified time interval. The resource information update unit 223 updates the resource information stored in the resource information storage unit 222 by the received resource information.

FIG. 15 shows in a flowchart the procedure of the information notifying process that an agent 3a follows in response to a predetermined event. When there takes place an event such as a system error of the OS or an application error or an event indicating that the CPU load of the agent 3a exceeds the threshold value, the static schedule generation unit 224 requests transmission of resource information to the agent 3a. The event management unit 304 monitors events that can take place irregularly and stands by until an event takes place (Step H1). When the event management unit 304 detects an event that takes place, it transmits a notification of the event to the notification management unit 303.

The notification management unit 303 determines whether or not the event that takes place specifies that resource information is to be transmitted in response to the event under the transmission conditions stored in the procedure illustrated in FIG. 13 (Step H2). When the notification management unit 303 determines in Step H2 that it is specified to transmit resource information in response to the generation of the event, the notification management unit 303 starts the process of transmitting resource information and acquires the resource information 31 to be transmitted by way of the resource information acquisition unit 302 (Step H3). Thereafter, the notification management unit 303 transmits the acquired resource information 31 to the resource information update unit 223 by way of the manager connection unit 301 (Step H4). When the notification management unit 303 determines in Step H2 that it is not specified to transmit resource information in response to the generation of the event, the notification management unit 303 returns to Step H1 and stands by until the next event takes place.

FIG. 16 shows in a flowchart the procedure of the process of releasing an automatic notification request. When the static schedule generation unit 224 releases the automatic notification from an agent 3a, it transmits an automatic notification release request (Step 11). The notification management unit 303 receives this automatic notification release request by way of the management connection unit 301 (Step 12). Then, it finds out the information relating to the automatic notification to be released from the stored settings for authentication notification and destroys the information (Step 14). Thereafter, the agent 3a transmits resource information to the resource information update unit 223 according to an agent access from the side of the resource management component 22.

It is assumed here that server host information, application information and network information are to be handled by means of the resource management system 100a of the present embodiment. The resource management component 22 requests the agent 3a that acquires information on the setting of the network equipment for automatic notification of resource information, for example. The agent 3a notifies the resource management component 22 of resource information at the time interval specified in the automatic notification request, at a time interval of 5 seconds for instance. The resource management component 22 accesses the agent 3a based on the schedule stored in the schedule storage unit 225 for resource information other than information on the setting of the network equipment.

In the present embodiment, the agent 3a automatically transmits resource information under the conditions specified by the resource management component 22. With this arrangement, the resource management component 22 can acquire resource information from the agent 3a without executing the process of an agent access, and thus reduce the number of agent accesses by the resource management component 22 and hence the processing load in addition to the advantages that the first embodiment provides.

The setting of automatic notification of resource information can be arbitrarily defined and released by means of an automatic notification request from the resource management component 22 in the present embodiment. Additionally, the conditions of automatic notification of resource information can be arbitrarily defined. With this arrangement, it is possible to realize an update notification process that satisfies the request of the resource management component 22. For instance, when the updating interval is altered by the dynamic schedule generation unit 229, the resource management component 22 can update resource information at the altered updating interval. Additionally, the agent 3a is adapted to notify the resource management component 22 of what takes place non-periodically such as a situation where the load of CPU of the agent 3a exceeds the threshold value and a situation where a trouble occurs. With this arrangement, the resource management component 22 can acquire such information without periodically accessing the agent.

FIG. 17 sows the configuration of a computer for realizing the resource management component 22. The computer 220 includes an input unit 4, a resource information management program 5, a data processing unit 6, an output unit 7 and a memory unit 8. The resource information management program 5 is read into the data processing unit 6 to control the operation of the data processing unit 6 and realizes the retrieval processing unit 221, the resource information update unit 223, the static schedule generation unit 224, the agent connection management unit 226, the workflow execution unit 227, the event management unit 228, the dynamic schedule generation unit 229, the system state monitor unit 230, the cache monitor unit 231, the retrieval process monitor unit 232 and the trouble detection unit 233. The storage unit 8 realizes the resource information storage unit 222 and the cache update schedule storage unit 225. The resource management components 22 of the first through third embodiments are realized by means of such a computer 220.

While the updating schedule of each resource generated by the static schedule generation unit 224 is stored in the schedule storage unit 225 upon starting to operate in the second embodiment, the present invention is by no means limited thereto. For example, it is possible to allow the schedule storage unit 225 to store the updating schedule for updating each resource at the same updating interval by way of the input unit 4 and then allow the dynamic schedule generation unit 229 to modify the updating schedule.

FIGS. 18(a) to (d) illustrate a timetable for modifying the updating schedule. Initially, the updating interval is defined to be 4 seconds for each resource (FIG. 18(a)). The resource is updated every 4 second from a given clock time t. When the resource information of host01, host02 and host03 is updated from the resource information stored in the resource information storage unit 222, the dynamic schedule generation unit 229 reduces the updating interval of the resource information of the host servers from 4 seconds to 3 seconds. When the resource information of L2SW and L3SW is not altered from that stored in the resource information storage unit 222, the dynamic schedule generation unit 229 prolongs the updating interval of those network equipments from 4 seconds to 5 seconds (FIG. 18B).

The resource information update unit 223 updates the resource information of Host01, Host02 and Host03 at 7 seconds after a given clock time t based on the altered updating schedule. When the resource information of the server hosts is not altered as a result of the update, the resource information update unit 223 prolongs the updating interval of those server hosts from 3 seconds to 4 seconds (FIG. 18C). Subsequently, the resource information update unit 223 updates the resource information of L2SW and L3SW at 9 seconds after a given clock time t. When the resource information of the network equipments is not altered as a result of the update, the dynamic schedule generation unit 229 prolongs the updating interval of those network equipments from 5 seconds to 6 seconds (FIG. 18D). By doing so, it is possible to update the resource information of each resource at an updating interval suited for the state of the resource without preparing an updating schedule for each resource.

Meanwhile, the updating interval of resource information may becomes excessively long when the updating interval is prolonged gradually for the resource information that has not been changed for a long period of time. To prevent such a situation from taking place, the dynamic schedule generation unit 229 may define an upper limit value in advance for the updating interval of each resource. The updating interval can fluctuate between two values when the updating interval is prolonged and shortened repeatedly. In such a case, the dynamic schedule generation unit 229 may select the average of the two values for the updating interval of the resource information. Then, it is possible to stabilize the updating interval.

While the present invention is described above by way of preferred embodiments, the resource management system according to the present invention is by no means limited to the above-described embodiments, which may be modified and altered in various different ways without departing from the spirit and scope of the present invention.

BRIEF DESCRIPTION OF THE DRAWINGS

FIG. 4 is a concrete example of the resource profile;

Figure 1:
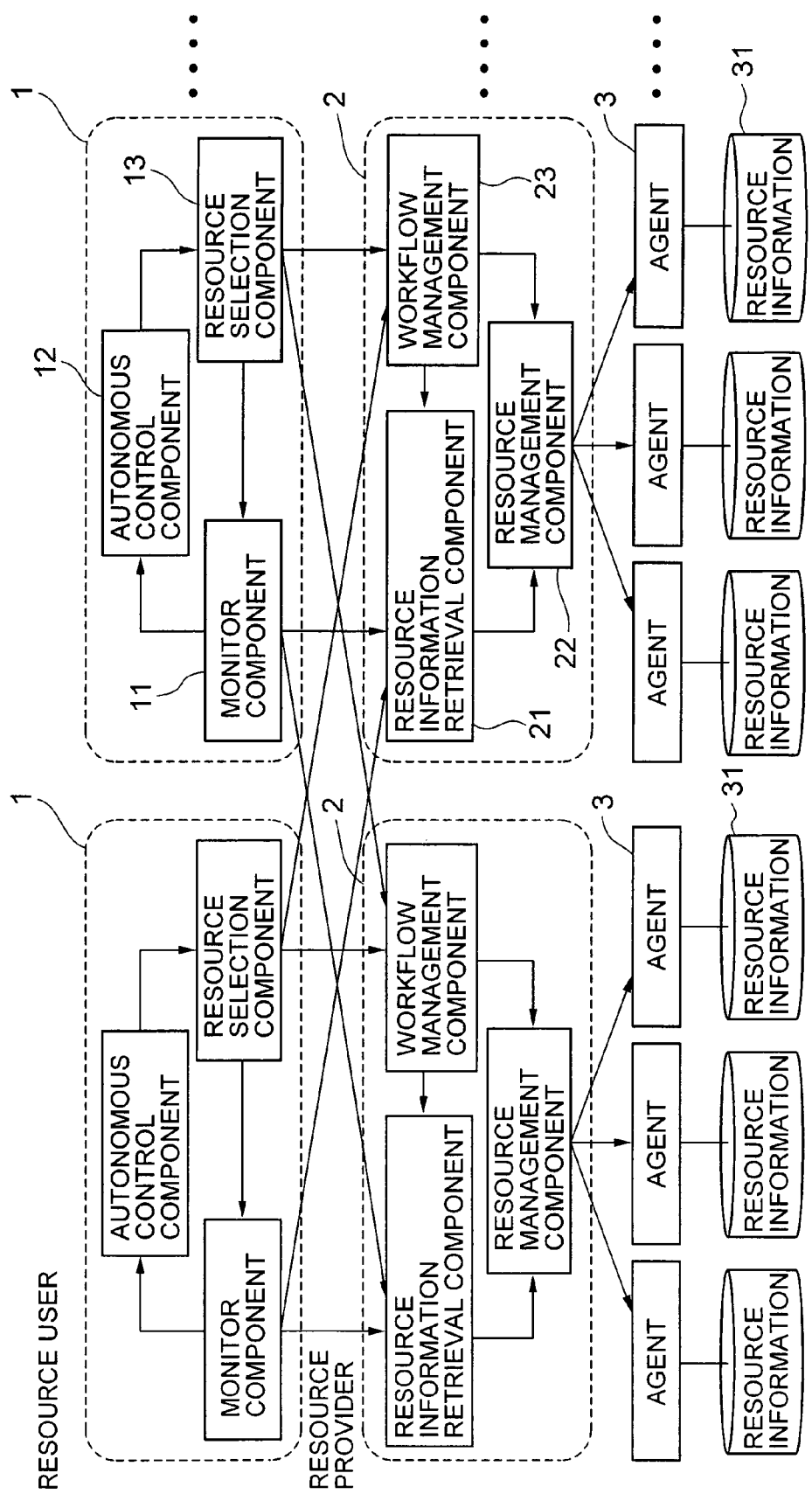
FIG. 1 is a block diagram showing the configuration of a resource management system according to a first embodiment of the present invention.
Figure 2:
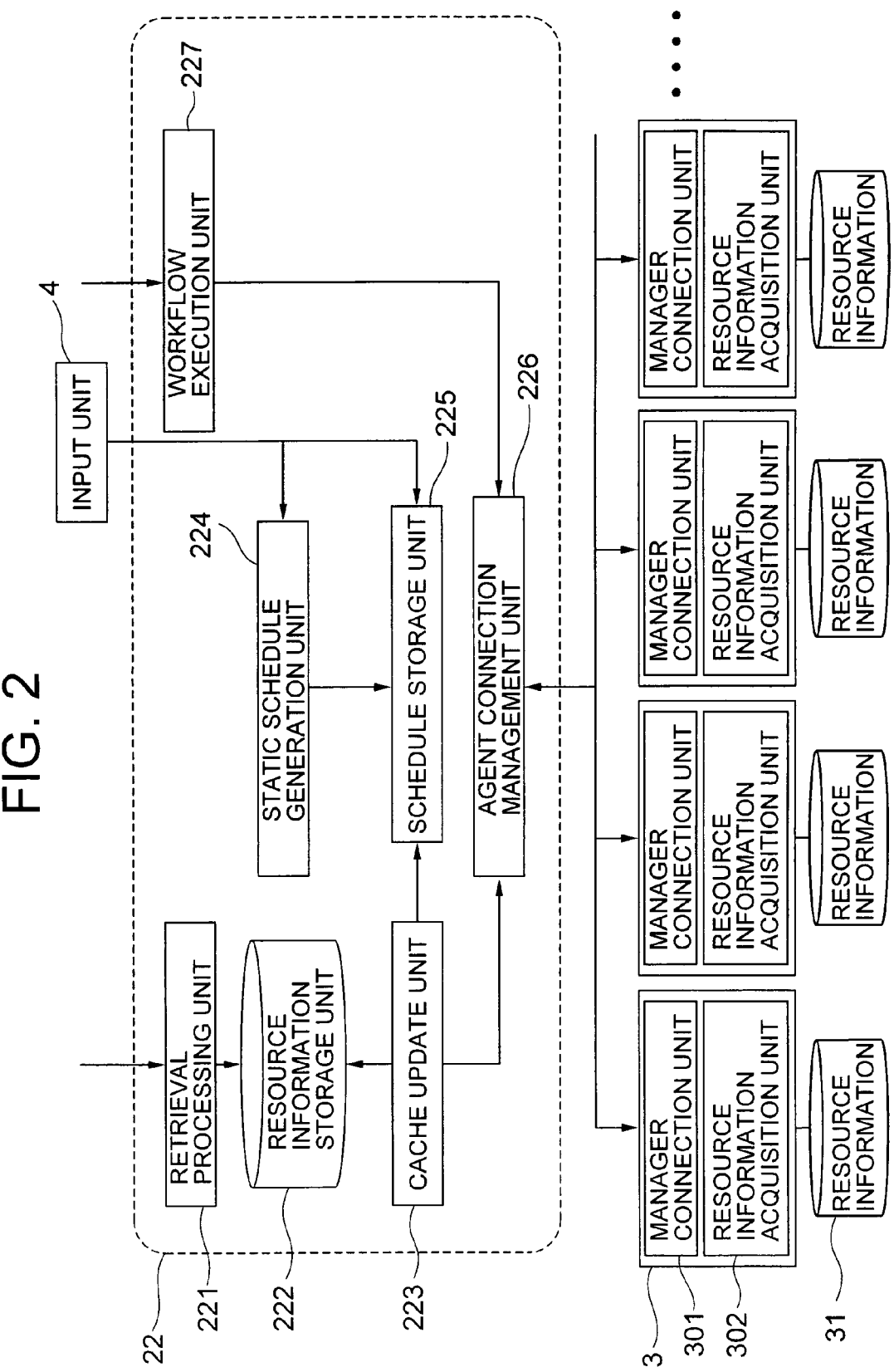
FIG. 2 is a block diagram showing the detailed configuration of the resource management component 22 and agents 3.
Figure 3:
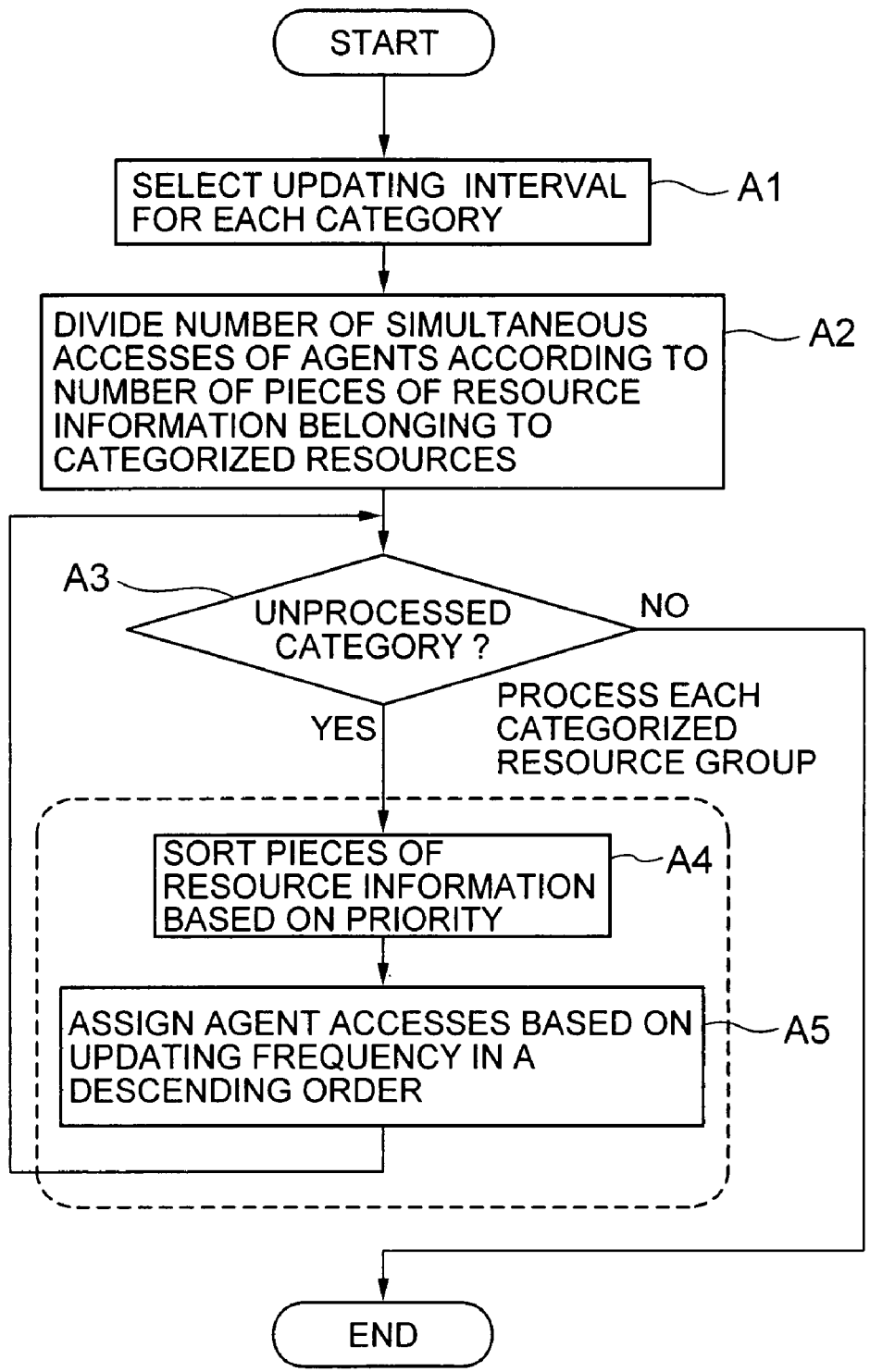
FIG. 3 is a flowchart showing the algorithm of static schedule generation by the static schematic generation unit 224.
Figure 5:
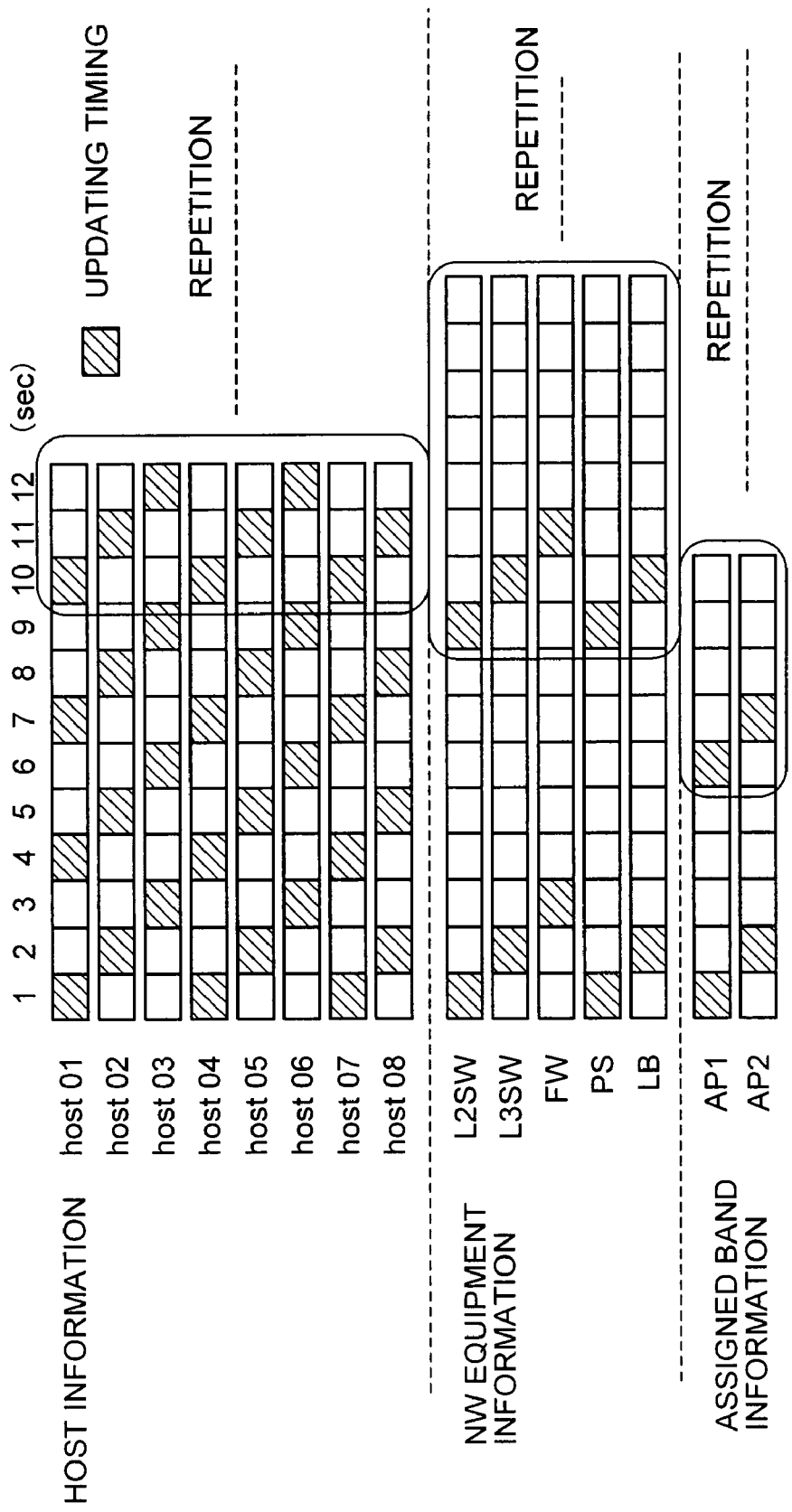
FIG. 5 is a timetable showing a concrete example of the static schedule generated by the static schedule generation unit 224.
Figure 6:
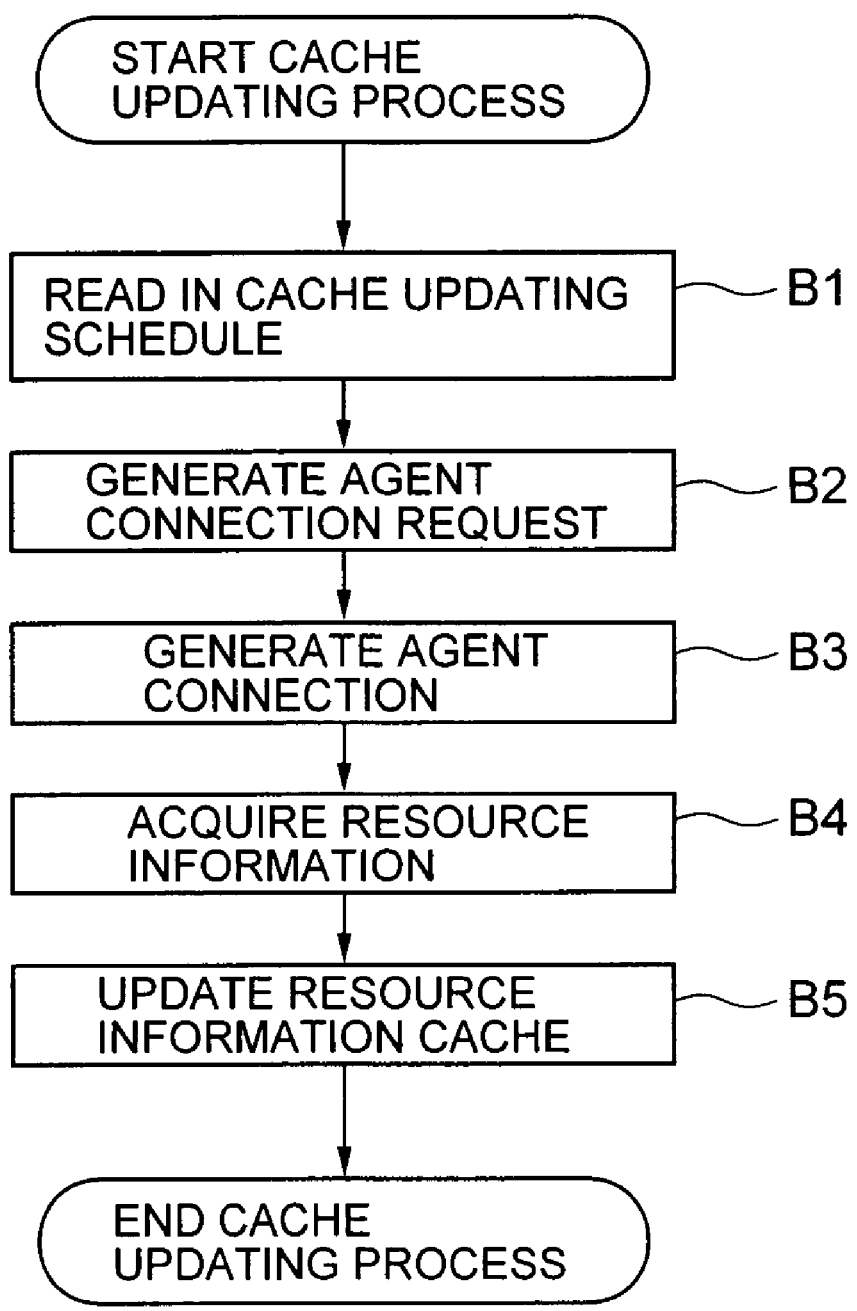
FIG. 6 is a flowchart showing the procedure of operation in the cache updating process.
Figure 7:
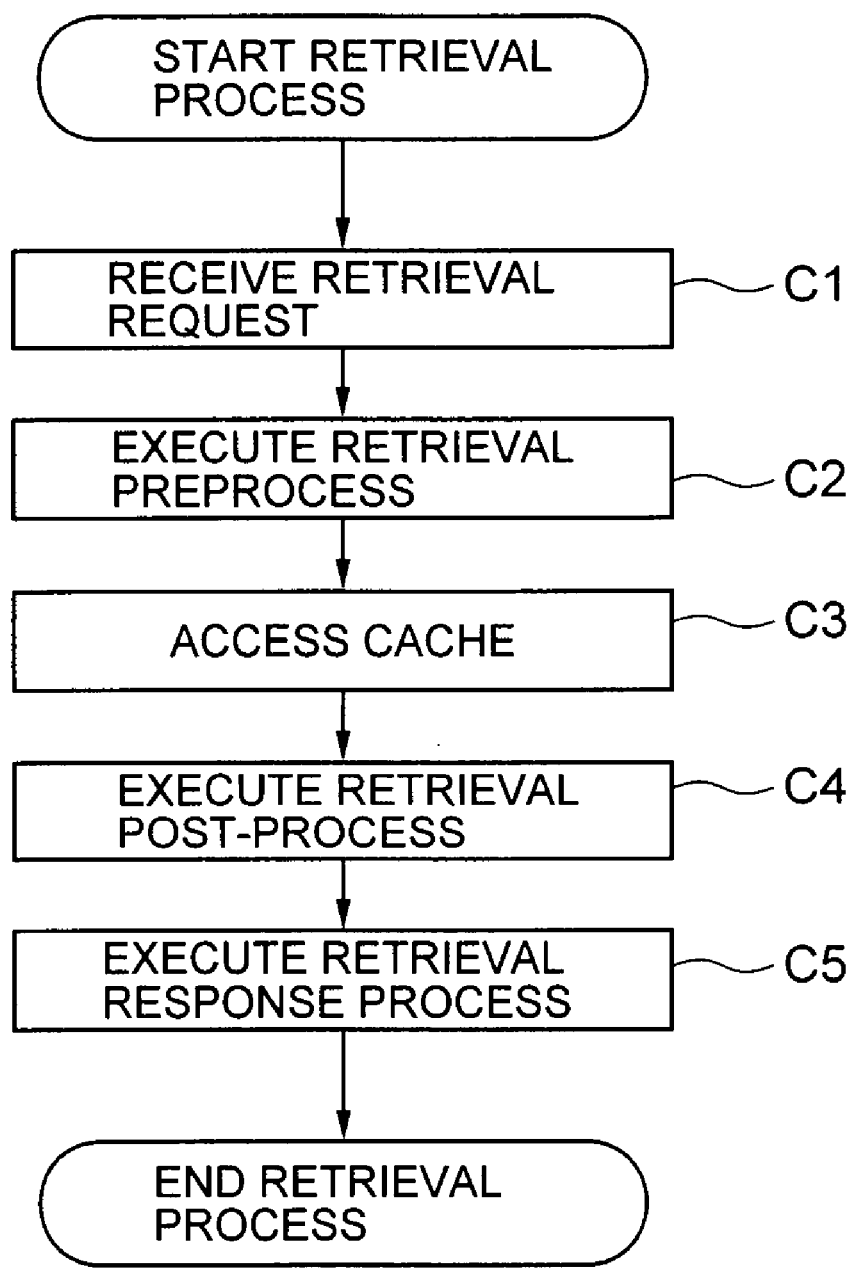
FIG. 7 is a flowchart showing the procedure of operation in the resource information retrieval requesting process.
Figure 8:
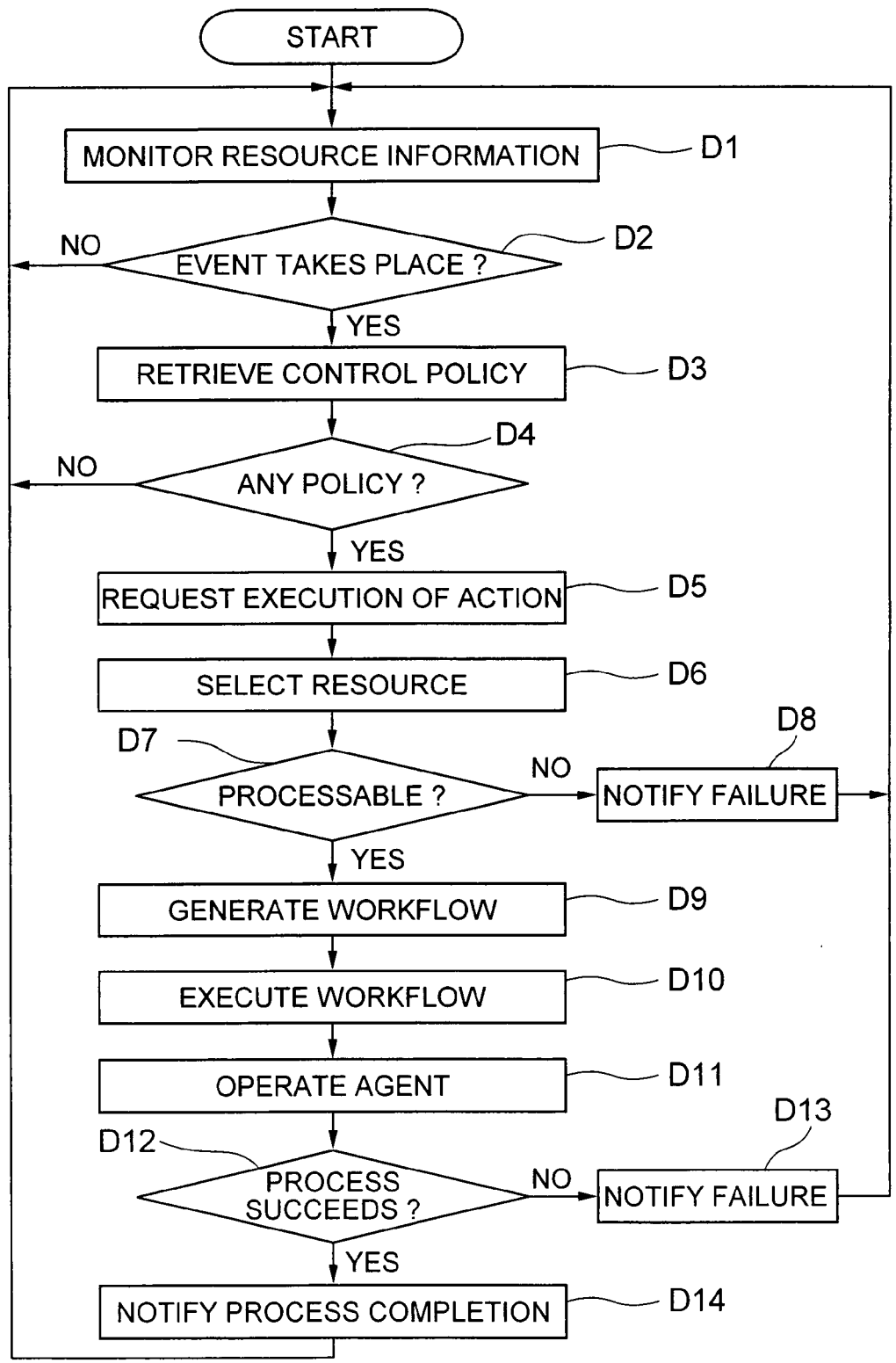
FIG. 8 is a flowchart showing the procedure of operation in the resource management system.
Figure 9:
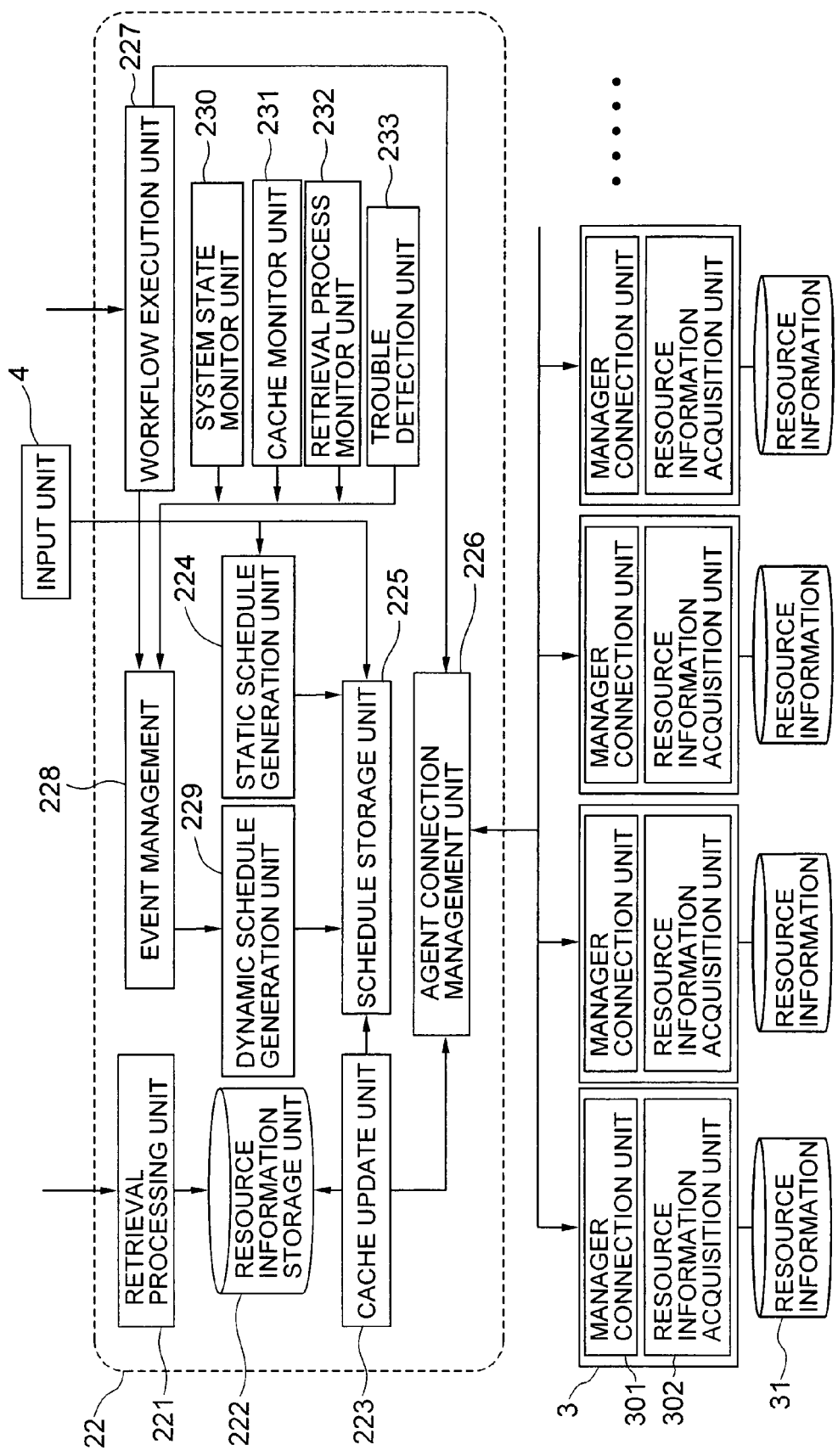
FIG. 9 is a block diagram sowing the configuration of the resource management component 22 in a resource management system according to a second embodiment of the present invention.
Figure 10:
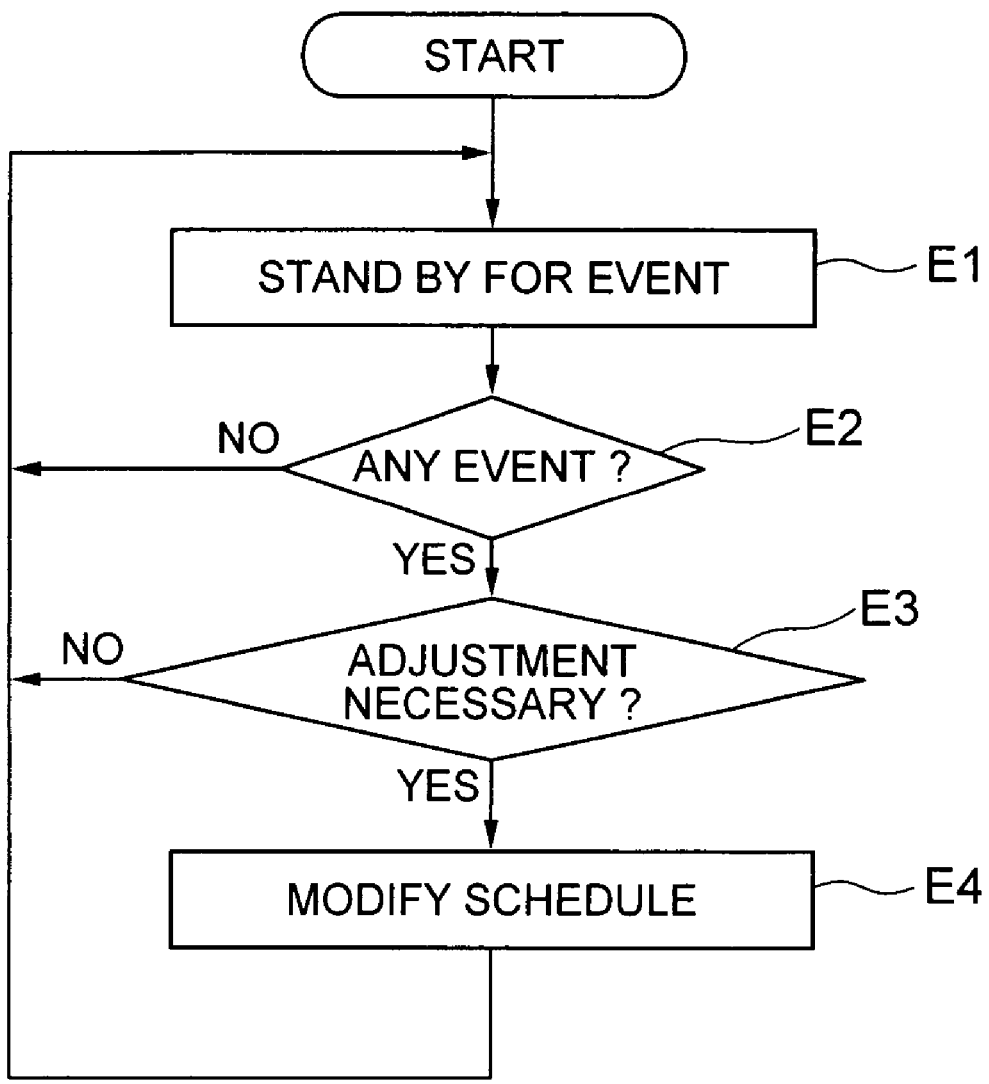
FIG. 10 is a flowchart showing the procedure operation in the cache updating schedule modifying process.
Figure 11:
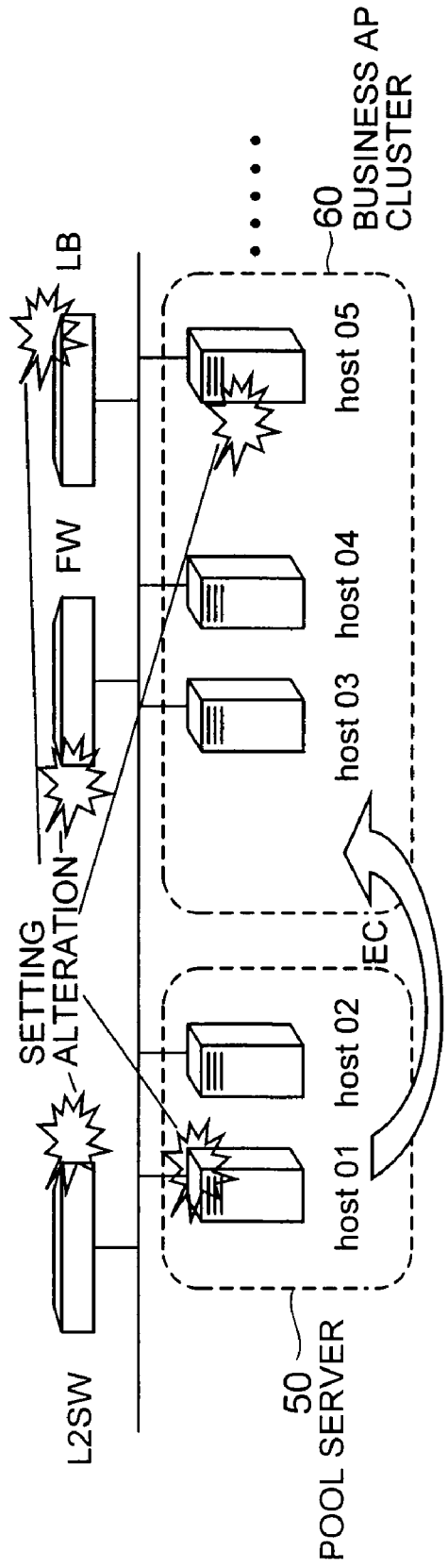
FIG. 11 is a block diagram showing a computer system that is the object of management.
Figure 12:
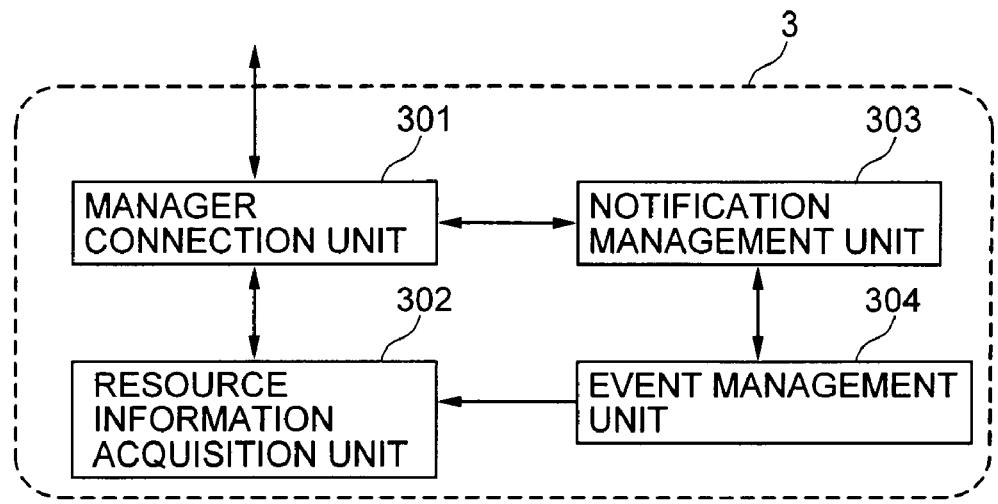
FIG. 12 is a block diagram showing the configuration of an agent in a resource management system according to a second embodiment of the present invention.
Figure 13:
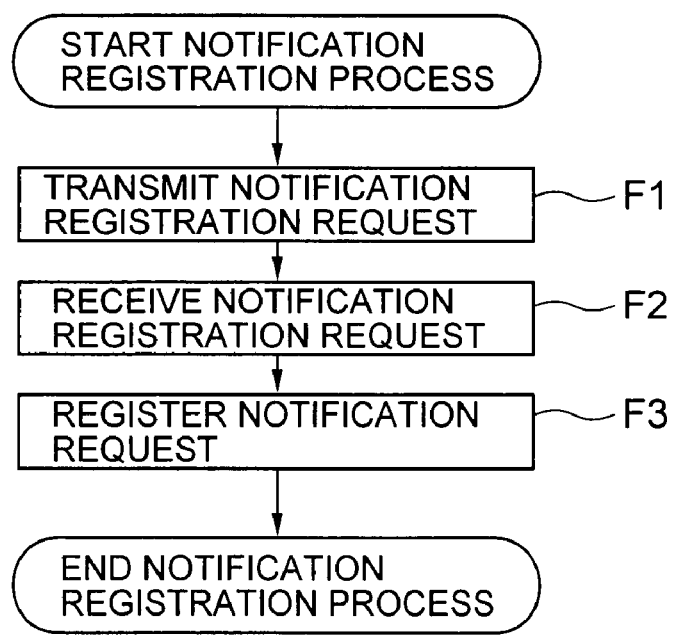
FIG. 13 is a flowchart showing the procedure of operation in the process of registering a schedule in the notification management unit 303.
Figure 14:
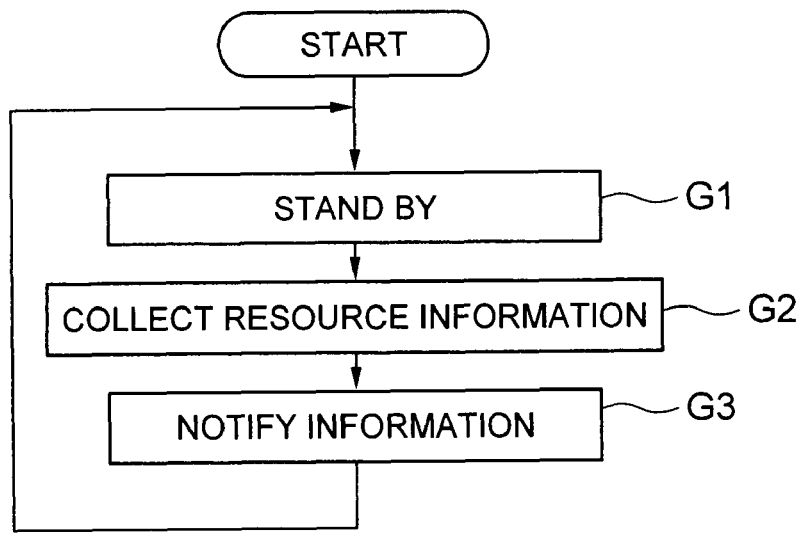
FIG. 14 is a flowchart showing the procedure of operation in the resource information notifying process.
Figure 15:
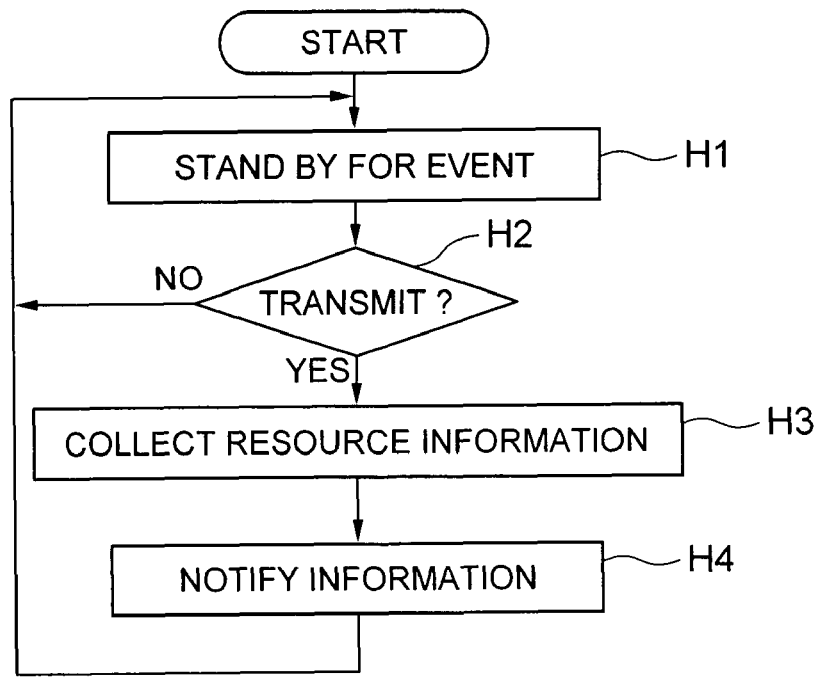
FIG. 15 is a flowchart showing the procedure of operation in the information notifying process upon starting of an event.
Figure 16:
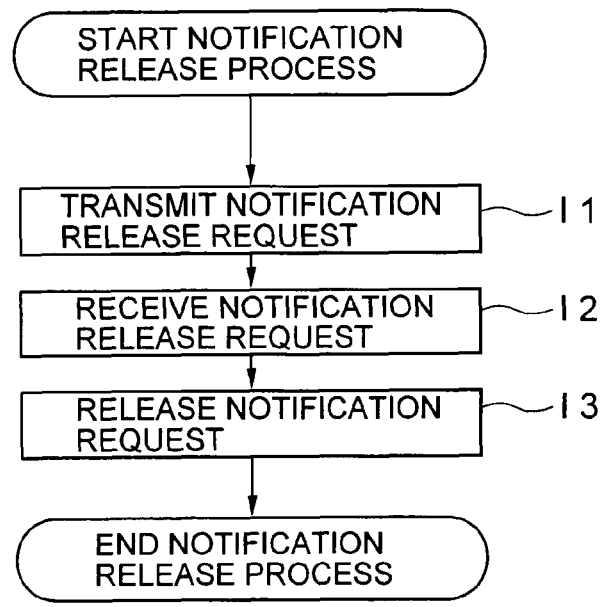
FIG. 16 is a flowchart showing the procedure of operation in the process of releasing an automatic notification request.
Figure 17:
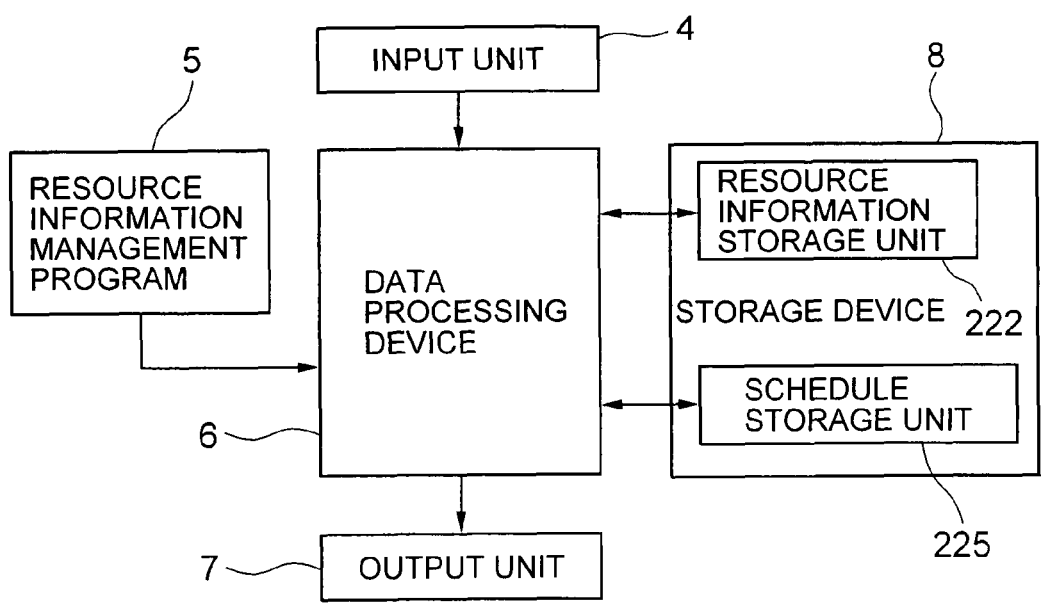
FIG. 17 is a block diagram showing the configuration of a computer for realizing the resource management component 22.
Figure 18:
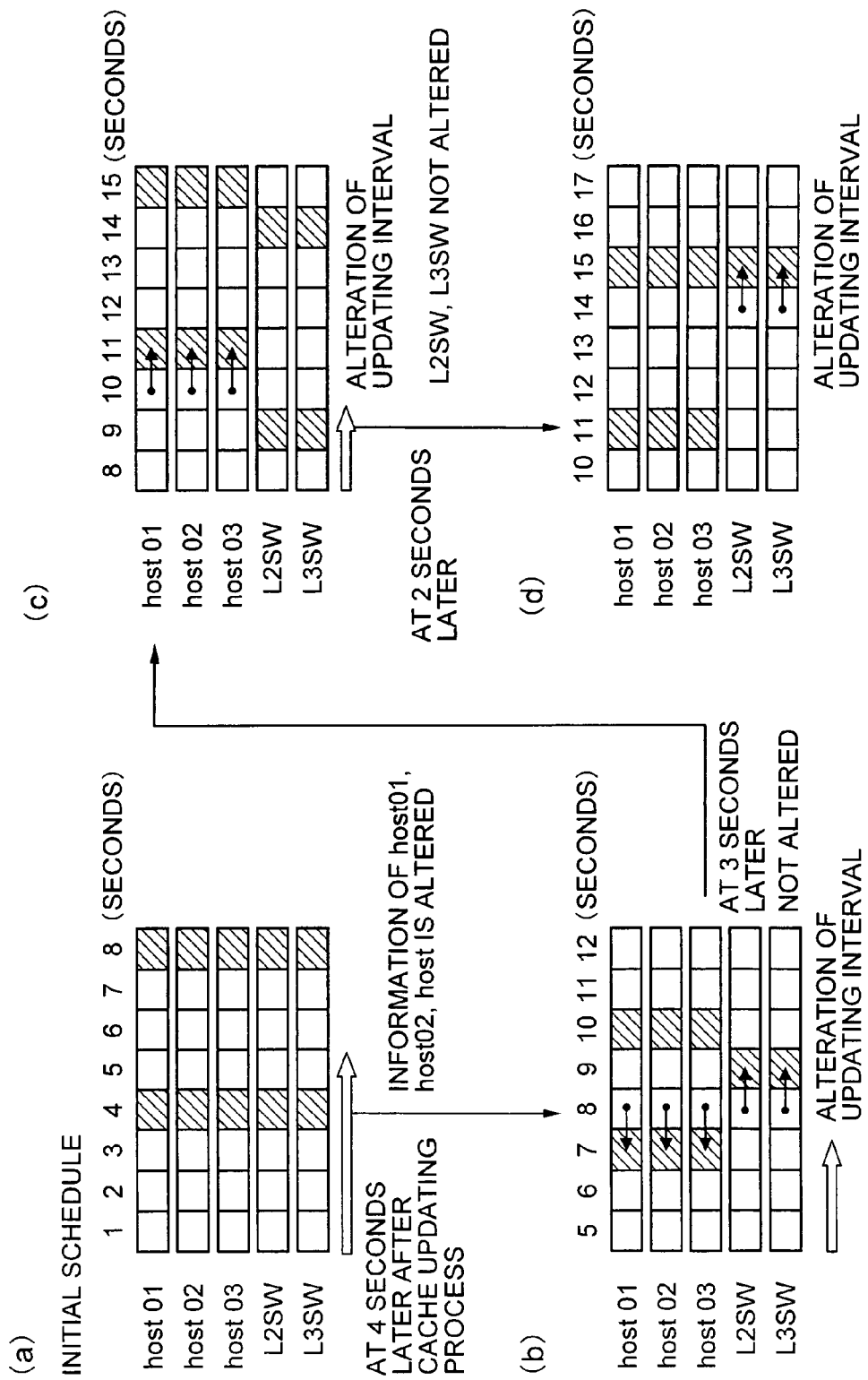
FIGS. 18(*a*) to (*d*) are timetables for showing modification of the updating schedule.

The invention claimed is:

1. A resource management system comprising a resource information providing server for providing resource information relating a plurality of resources connected to a network in response to a request from a resource user, wherein:
  the resource information providing server includes: a resource information storage unit storing therein resource information; a schedule storage unit storing therein an updating schedule of the resource information stored in the resource information storage unit; and a resource information update unit for acquiring the resource information based on the schedule stored in the schedule storage unit; and updating the resource information stored in the resource information storage unit by the acquired resource information,
  the schedule storage unit stores therein at least an updating schedule having an updating interval and an updating timing defined for each resource for which resource information is to be acquired; and
  an agent for collecting resource information from the resources, the agent being adapted to transmit resource information to the resource information update unit, and the updating timing being defined based on the number of agents capable of simultaneously accessing the resource information update unit,
  wherein the agent registers notification conditions and an automatic notification request that specifies resource information in advance and, when notification conditions specified by the automatic notification request arise, the agent transmits the resource information specified by the automatic notification request to the resource information update unit.

2. The resource management system according to claim 1, wherein the different types of resources have different updating time intervals.

3. The resource management system according to claim 1, wherein the resource information providing server further includes a static schedule generation unit for generating the updating schedule based on information including the performance of the resource information providing server, and information selected from the group consisting of an expected frequency of updating resource information, an expected frequency of request for resource information from resource users, an updating time length expected to required to update each piece of resource information and a number of resources, and storing the generated updating schedule in the schedule storage unit.

4. The resource management system according to claim 3, wherein the dynamic schedule generation unit shortens the updating interval of the resource information of an altered resource when the configuration of a resource is altered.

5. The resource management system according to claim 1, wherein the resource information providing server further includes a dynamic schedule generation unit for dynamically modifying the updating schedule stored in the schedule storage unit based on a state of the resource information providing server, and at least one of a state of the resources and a state of the communication line.

6. The resource management system according to claim 5, wherein the dynamic schedule generation unit modifies the updating schedule based on an increase or decrease of the number of resources.

7. The resource management system according to claim 5, wherein the dynamic schedule generation unit shortens the updating interval of the resource information for which the request is produced when a request for resource information is produced by a resource user.

8. The resource management system according to claim 5, wherein the dynamic schedule generation unit shortens the updating interval of the resource information relating to a trouble when the trouble arises to any of the resources or a communication line.

9. The resource management system according to claim 5, wherein the dynamic schedule generation unit prolongs the updating interval of the resource information that has not altered by past updates of resource information.

10. The resource management system according to claim 5, wherein the dynamic schedule generating unit prolongs the updating interval of resource information as a whole when a load of the resource information providing server or the communication line rises.

11. A resource management system comprising a resource information providing server for providing resource information relating to a plurality of resources connected to a network in response to a request from a resource user, wherein:
  the resource information providing server includes: a resource information storage unit storing resource information; a schedule storage unit storing an updating schedule of the resource information stored in the resource information storage unit; a resource information update unit for acquiring the resource information according to the schedule stored in the schedule storage unit and updating the resource information stored in the resource information storage unit by the acquired resource information; and a dynamic schedule generation unit for dynamically modifying the updating schedule stored in the schedule storage unit based on a state of the resource information providing server, and at least one of a state of the resources and a state of the communication line, the updating schedule stored in the schedule storage unit having an updating timing defined for each resource for which resource information is to be acquired; and an agent for collecting resource information from the resources, the agent being adapted to transmit resource information to the resource information update unit, and the updating timing being defined based on the number of agents capable of simultaneously accessing the resource information update unit, wherein the agent registers notification conditions and an automatic notification request that specifies resource information in advance and, when notification conditions specified by the automatic notification request arise, the agent transmits the resource information specified by the automatic notification request to the resource information update unit.

12. A method for providing resource information by means of a resource information providing server for providing resource information relating to a plurality of resources connected to a network, in response to a request from a resource user, the method comprising:

storing in a schedule storage unit an updating schedule defining an updating timing of resource information and including an updating interval selected at least for each resource for which resource information is to be acquired;

acquiring resource information based on the updating schedule stored in the schedule storage unit and storing the acquired resource information in a resource information storage unit;

providing the resource information stored in the resource information storage unit in response to a request from a resource information user;

collecting, via an agent, resource information from the resources;

transmitting, via the agent, resource information to a resource information update unit, the updating timing being defined based on the number of agents capable of simultaneously accessing the resource information update unit; and registering, via the agent, notification conditions and an automatic notification request that specifies resource information in advance and, when notification conditions specified by the automatic notification request arise, transmitting the resource information specified by the automatic notification request to the resource information update unit.

13. The resource management method according to claim 12, wherein the different types of resources have different updating time intervals.

14. A method for providing resource information by means of a resource information providing server for providing resource information relating to a plurality of resources connected to a network in response to a request from a resource user, the method comprising:

storing an updating schedule defining the updating timing of resource information in a schedule storage unit;

acquiring resource information according to the updating schedule stored in the schedule storage unit and storing the acquired resource information in a resource information storage unit;

dynamically modifying the updating schedule stored in the schedule storage unit based on a state of the resource information providing server, and at least one of a state of the resources and a state of a communication line;

providing the resource information stored in the resource information storage unit in response from a resource information user;

collecting, via an agent, resource information from the resources;

transmitting, via the agent, resource information to a resource information update unit, the updating timing being defined based on the number of agents capable of simultaneously accessing the resource information update unit; and registering, via the agent, notification conditions and an automatic notification request that specifies resource information in advance and, when notification conditions specified by the automatic notification request arise, transmitting the resource information specified by the automatic notification request to the resource information update unit.

15. A computer readable storage medium storing a program for a resource information providing server for providing resource information relating to a plurality of resources connected to a network, in response to a request from a resource user, the program defining:

storing in a schedule storage unit an updating schedule defining an updating timing of resource information and including an updating interval selected at least for each resource for which resource information is to be acquired;

acquiring resource information based on the updating schedule stored in the schedule storage unit and storing the acquired resource information in a resource information storage unit;

providing the resource information stored in the resource information storage unit in response to a request from a resource information user;

collecting, via an agent, resource information from the resources;

transmitting, via the agent, resource information to a resource information update unit, the updating timing being defined based on the number of agents capable of simultaneously accessing the resource information update unit; and registering, via the agent, notification conditions and an automatic notification request that specifies resource information in advance and, when notification conditions specified by the automatic notification request arise, transmitting the resource information specified by the automatic notification request to the resource information update unit.

16. The storage medium according to claim 15, wherein the different types of resources have different updating time intervals.

17. A computer readable storage medium storing a program for a resource information providing server for providing resource information relating to a plurality of resources connected to a network, in response to a request from a resource user, the program defining:

storing an updating schedule defining the updating timing of resource information in a schedule storage unit;

acquiring resource information according to the updating schedule stored in the schedule storage unit and storing the acquired resource information in a resource information storage unit;

dynamically modifying the updating schedule stored in the schedule storage unit based on a state of the resource information providing server, and at least one of a state of the resources and a state of communication line;

providing the resource information stored in the resource information storage unit in response to a request from a resource information user;

collecting, via an agent, resource information from the resources;

transmitting, via the agent, resource information to a resource information update unit, the updating timing being defined based on the number of agents capable of simultaneously accessing the resource information update unit; and registering, via the agent, notification conditions and an automatic notification request that specifics resource information in advance and when notification conditions specified by the automatic notification request arise, transmitting the resource information specified by the automatic notification request to the resource information update unit.

18. A resource management system comprising a resource information providing server for providing resource information relating a plurality of resources connected to a network in response to a request from a resource user, wherein:

the resource information providing server includes: a resource information storage unit storing therein resource information; a schedule storage unit storing therein an updating schedule of the resource information stored in the resource information storage unit; and a resource information update unit for acquiring the resource information based on the schedule stored in the schedule storage unit; and updating the resource information stored in the resource information storage unit by the acquired resource information, the schedule storage unit stores therein at least an updating schedule, having an updating interval and an updating timing defined for each resource for which resource information is to be acquired, wherein the updating schedule specifies the resource information to be acquired at each of the pollings that the resource information update unit carries out at a predetermined time interval, wherein the upper limit of the resource information to be acquired at each polling is specified based on the memory capacity of the resource information providing server.

19. A resource management system comprising a resource information providing server for providing resource information relating to a plurality of resources connected to a network in response to a request from a resource user, wherein:

the resource information providing server includes: a resource information storage unit storing resource information; a schedule storage unit storing an updating schedule of the resource information stored in the resource information storage unit; a resource information update unit for acquiring the resource information according to the schedule stored in the schedule storage unit and updating the resource information stored in the resource information storage unit by the acquired resource information; and a dynamic schedule generation unit for dynamically modifying the updating schedule stored in the schedule storage unit based on a state of the resource information providing server, and at least one of a state of the resources and a state of the communication line, wherein the updating schedule specifies the resource information to be acquired at each of the pollings that the resource information update unit carries out at a predetermined time interval, wherein the upper limit of the resource information to be acquired at each polling is specified based on the memory capacity of the resource information providing server.

20. A method for providing resource information by means of a resource information providing server for providing resource information relating to a plurality of resources connected to a network, in response to a request from a resource user, the method comprising:

storing in a schedule storage unit an updating schedule defining an updating timing of resource information and including an updating interval selected at least for each resource for which resource information is to be acquired;

acquiring resource information based on the updating schedule stored in the schedule storage unit and storing the acquired resource information in a resource information storage unit; and providing the resource information stored in the resource information storage unit in response to a request from a resource information user, wherein the updating schedule specifies the resource information to be acquired at each of the pollings that is carried out at a predetermined time interval, wherein the upper limit of the resource information to be acquired at each polling is specified based on the memory capacity of the resource information providing server.

21. A method for providing resource information by means of a resource information providing server for providing resource information relating to a plurality of resources connected to a network in response to a request from a resource user, the method comprising:

storing an updating schedule defining the updating timing of resource information in a schedule storage unit;

acquiring resource information according to the updating schedule stored in the schedule storage unit and storing the acquired resource information in a resource information storage unit;

dynamically modifying the updating schedule stored in the schedule storage unit based on a state of the resource information providing server, and at least one of a state of the resources and a state of a communication line; and providing the resource information stored in the resource information storage unit in response from a resource information user, wherein the updating schedule specifies the resource information to be acquired at each of the pollings that is carried out at a predetermined time interval, wherein the upper limit of the resource information to be acquired at each polling is specified based on the memory capacity of the resource information providing server.

22. A computer readable storage medium storing a program for a resource information providing server for providing resource information relating to a plurality of resources connected to a network, in response to a request from a resource user, the program defining:

storing in a schedule storage unit an updating schedule defining an updating timing of resource information and including an updating interval selected at least for each resource for which resource information is to be acquired;

acquiring resource information based on the updating schedule stored in the schedule storage unit and storing the acquired resource information in a resource information storage unit; and providing the resource information stored in the resource information storage unit in response to a request from a resource information user, wherein the updating schedule specifies the resource information to be acquired at each of the pollings that is carried out at a predetermined time interval, wherein the upper limit of the resource information to be acquired at each polling is specified based on the memory capacity of the resource information providing server.

23. A computer readable storage medium storing a program for a resource information providing server for providing resource information relating to a plurality of resources connected to a network, in response to a request from a resource user, the program defining:

storing an updating schedule defining the updating timing of resource information in schedule storage unit;

acquiring resource information according to the updating schedule stored in the schedule storage unit and storing the acquired resource information in a resource information storage unit;

dynamically modifying the updating schedule stored in the schedule storage unit based on a state of the resource information providing server, and at least one of a state of the resources and a state of communication line; and providing the resource information stored in the resource information storage unit in response to a request from a resource information user, wherein the updating schedule specifies the resource information to be acquired at each of the pollings that is carried out at a predetermined time interval, wherein the upper limit of the resource information to be acquired at each polling is specified based on the memory capacity of the resource information providing server.

* * * * *